Figure 1:
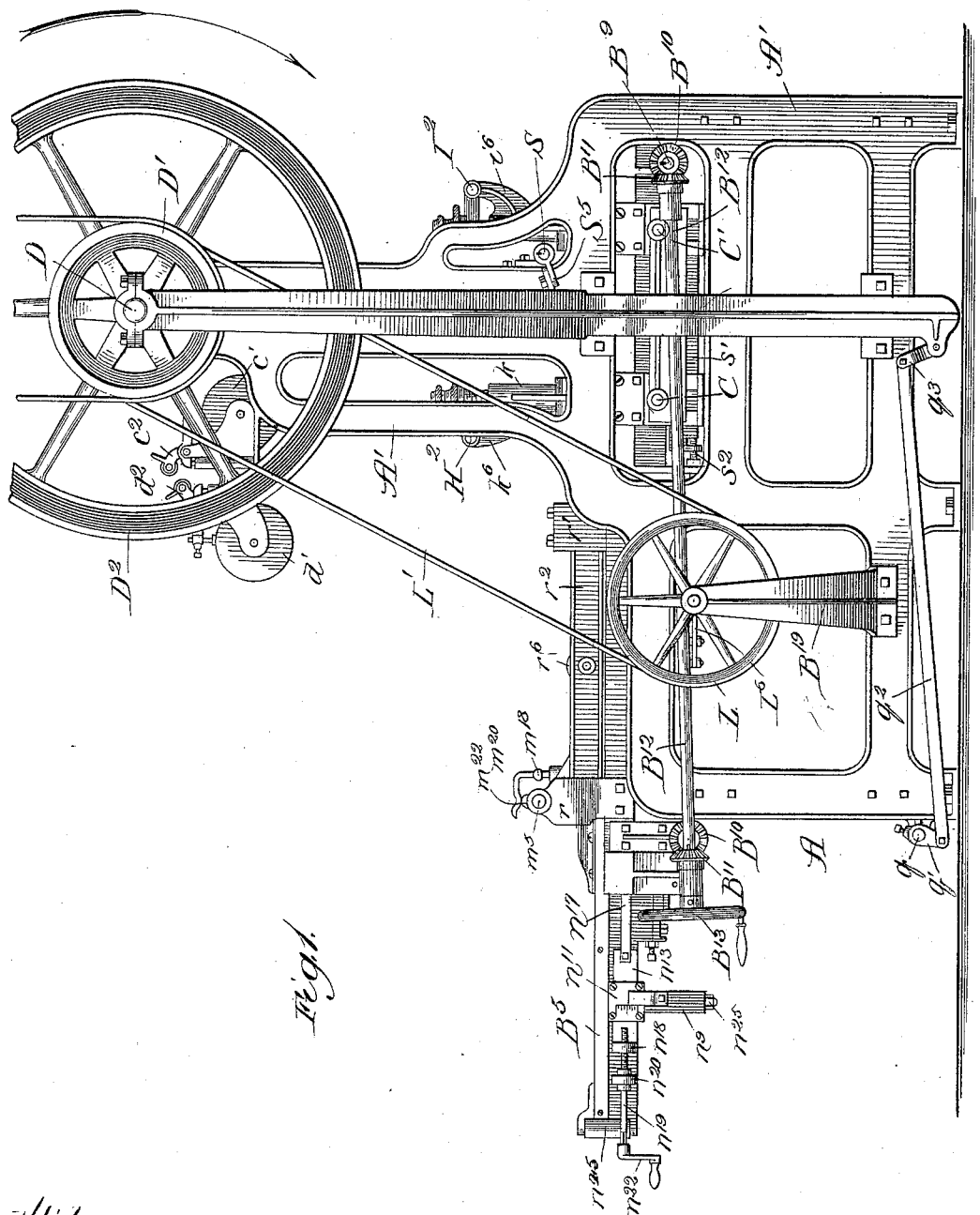
Figure 2:
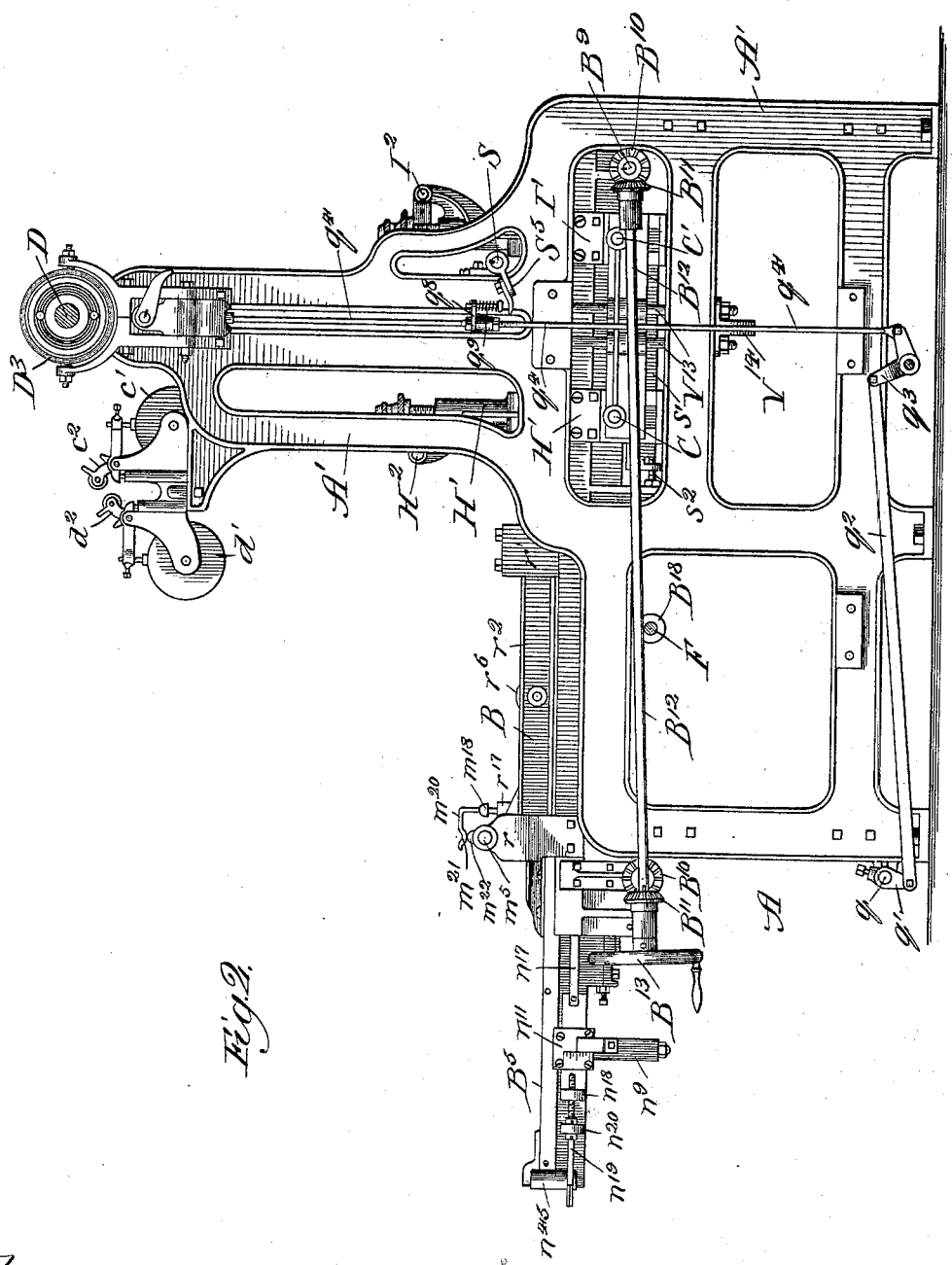
Figure 3:
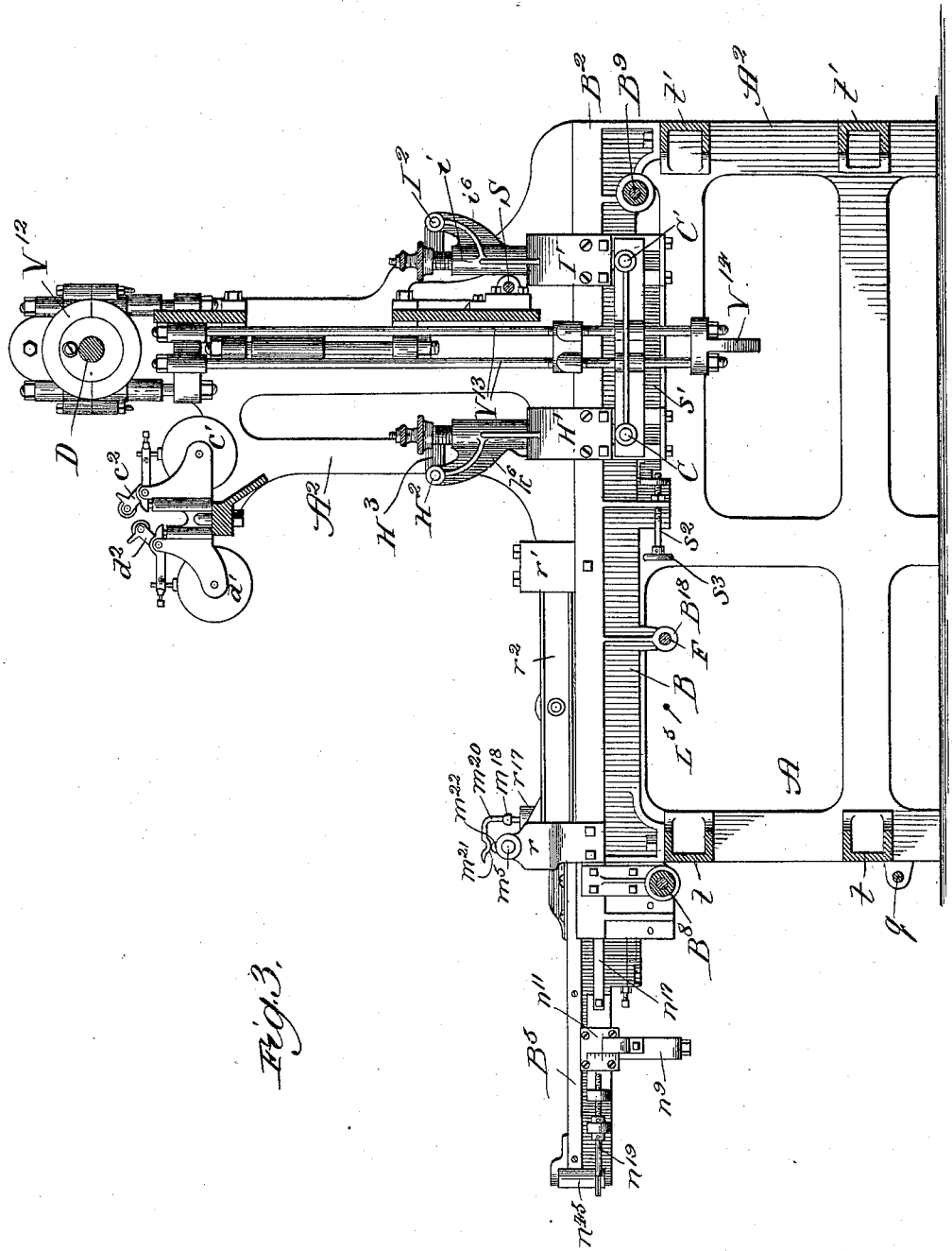

No. 608,809. Patented Aug. 9, 1898.
J. UHRI.
MACHINE FOR MAKING BOX BLANKS.
(Application filed Nov. 16, 1895.)
(No Model.) 27 Sheets—Sheet 1.

No. 608,809. Patented Aug. 9, 1898.
J. UHRI.
MACHINE FOR MAKING BOX BLANKS.
(Application filed Nov. 16, 1895.)
(No Model.) 27 Sheets—Sheet 5.

No. 608,809. Patented Aug. 9, 1898.
J. UHRI.
MACHINE FOR MAKING BOX BLANKS.
(Application filed Nov. 16, 1895.)
(No Model.) 27 Sheets—Sheet 6.

No. 608,809. Patented Aug. 9, 1898.
J. UHRI.
MACHINE FOR MAKING BOX BLANKS.
(Application filed Nov. 16, 1895.)
(No Model.) 27 Sheets—Sheet 7.

Witnesses:
Chas. E. Gaylord
Lute J. Peters

Inventor:
Jacob Uhri,
By Dyrenforth & Dyrenforth,
Attys

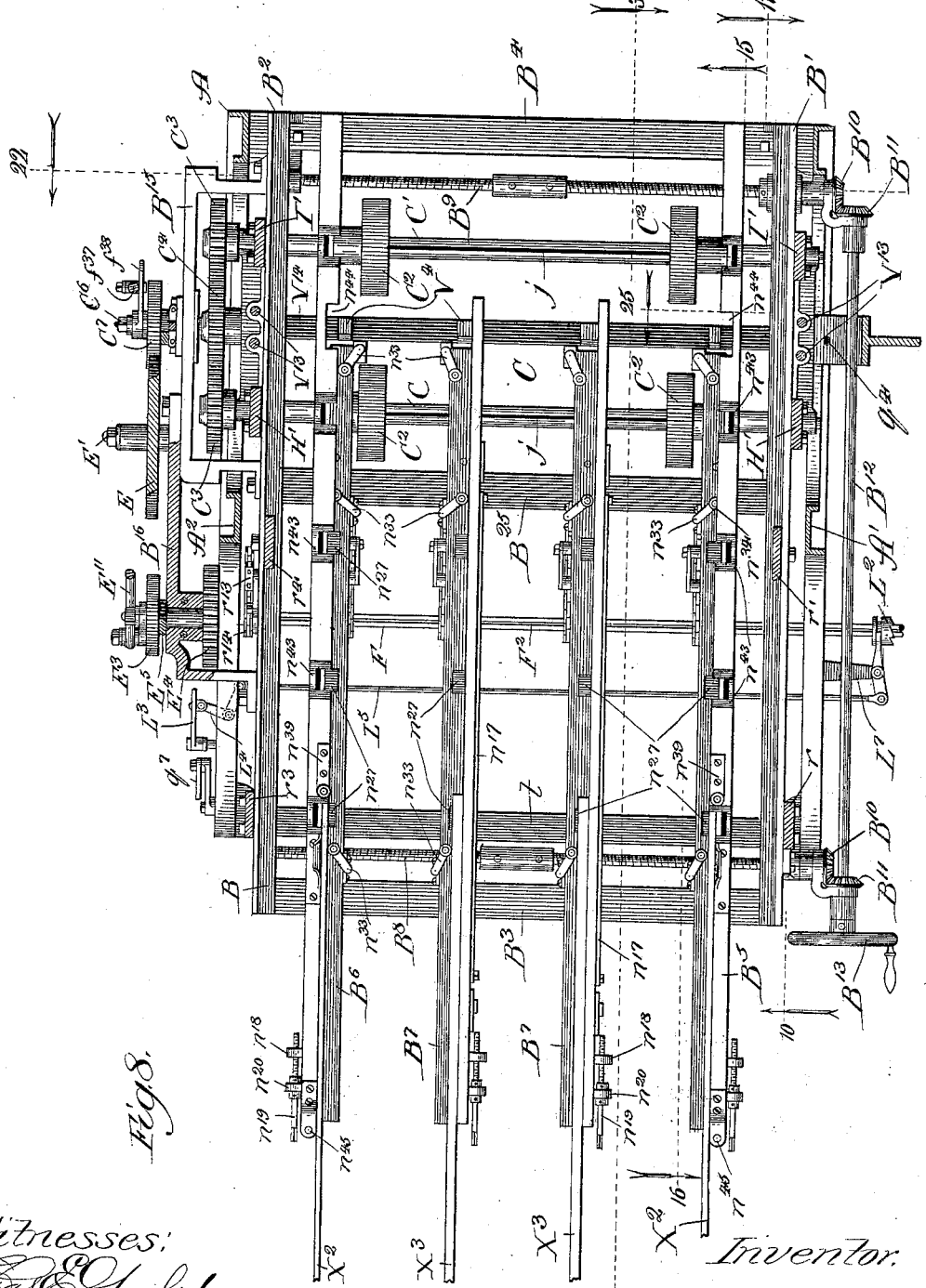

No. 608,809. Patented Aug. 9, 1898.
J. UHRI.
MACHINE FOR MAKING BOX BLANKS.
(Application filed Nov. 16, 1895.)
(No Model.) 27 Sheets—Sheet 9.
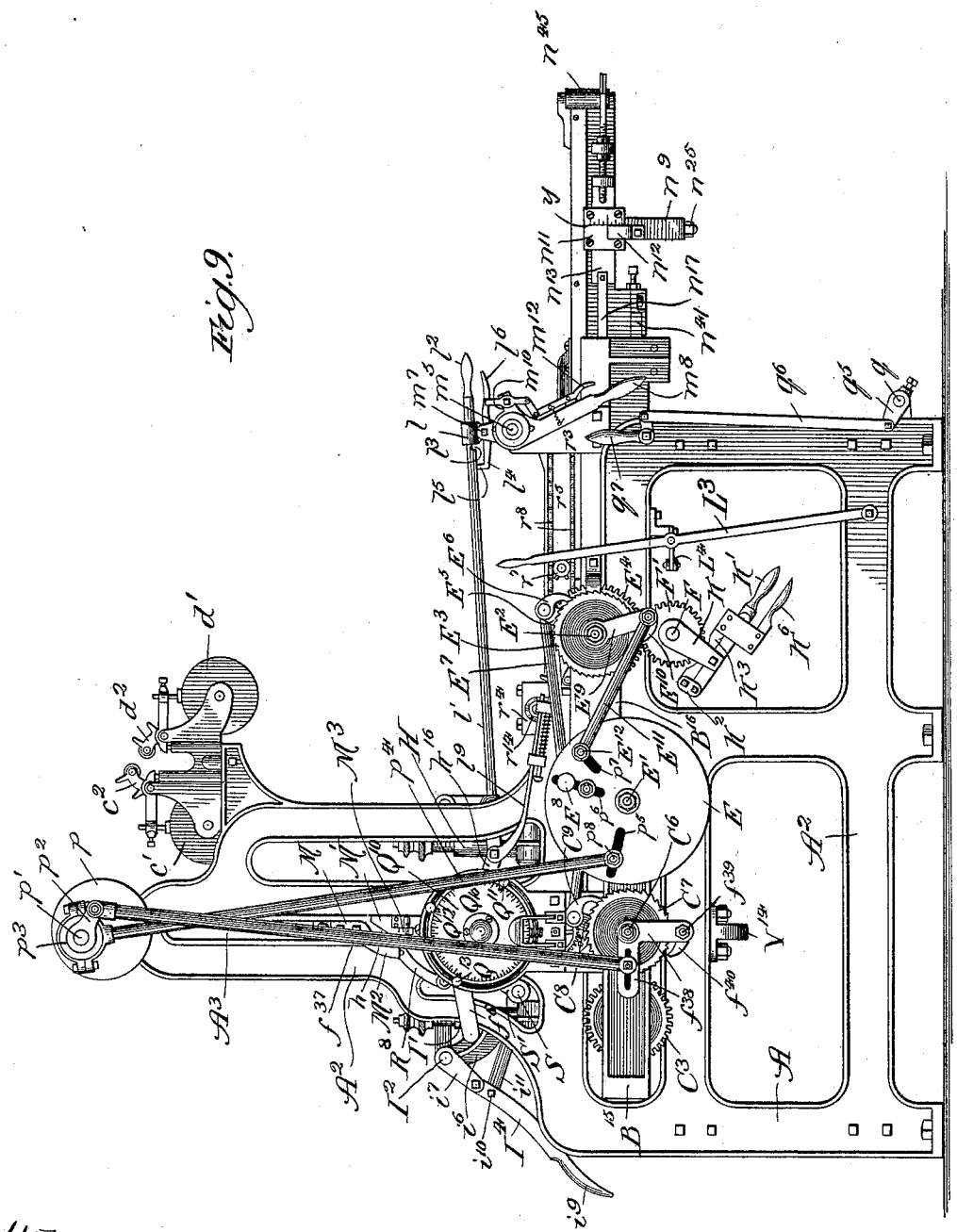
Witnesses:
Chas. E. Gaylord,
Lute J. Peter
Inventor:
Jacob Uhri,
By Dyrenforth & Dyrenforth
Att'ys No. 608,809. Patented Aug. 9, 1898.
J. UHRI.
MACHINE FOR MAKING BOX BLANKS.
(Application filed Nov. 16, 1895.)
(No Model.) 27 Sheets—Sheet 10.
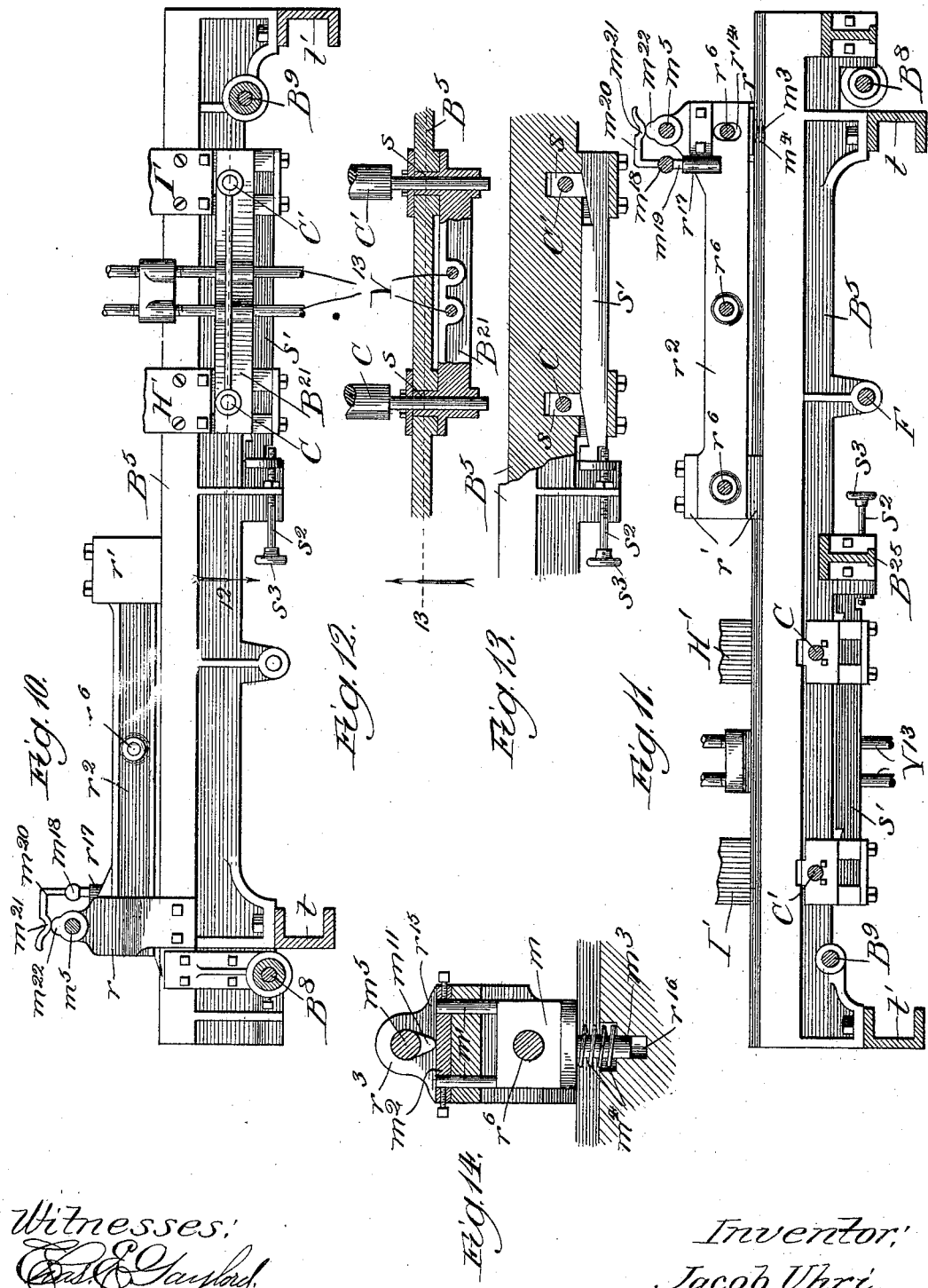
Witnesses:
Inventor:
Jacob Uhri,
By Dyrenforth & Dyrenforth,
Attys

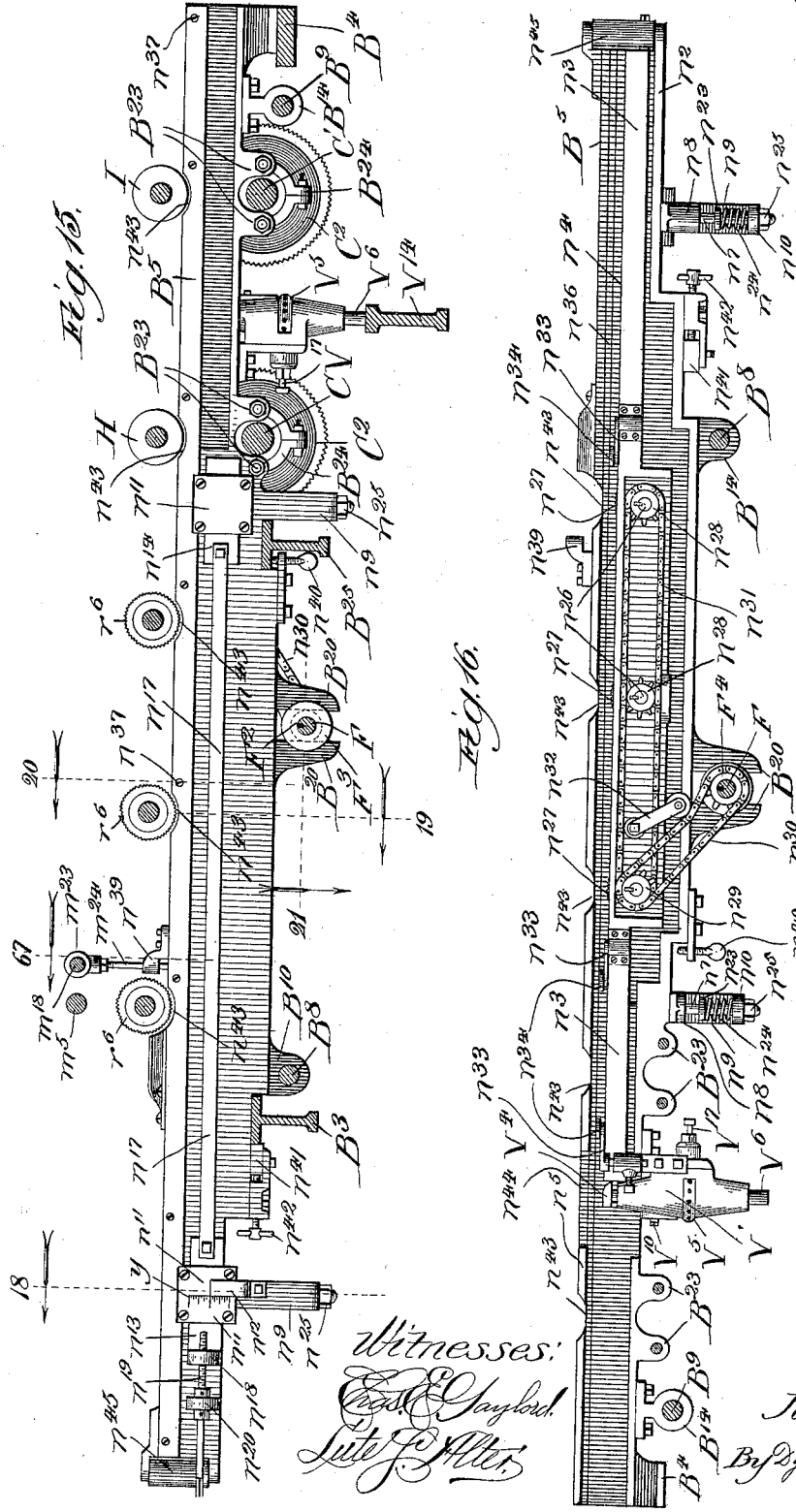

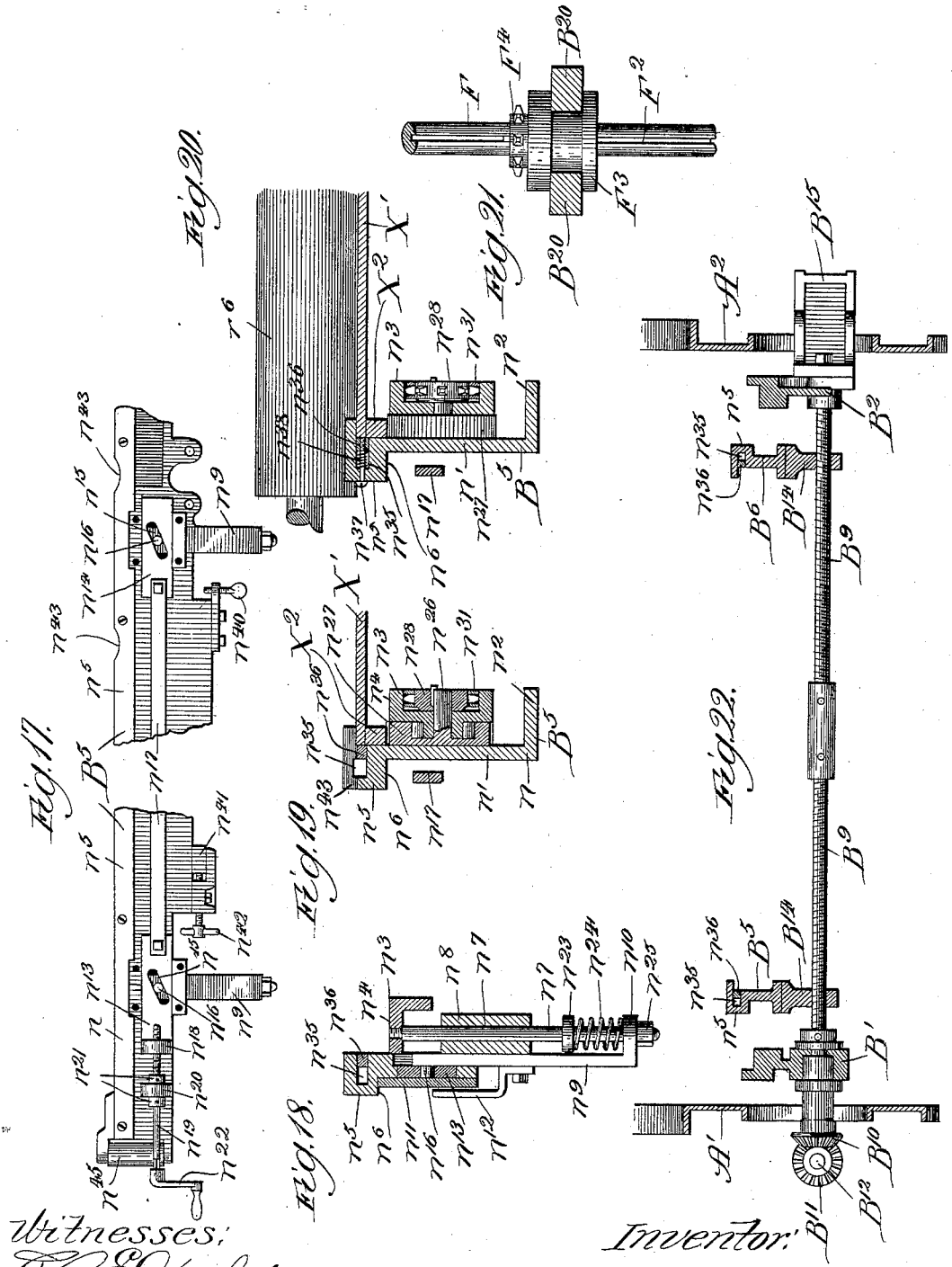

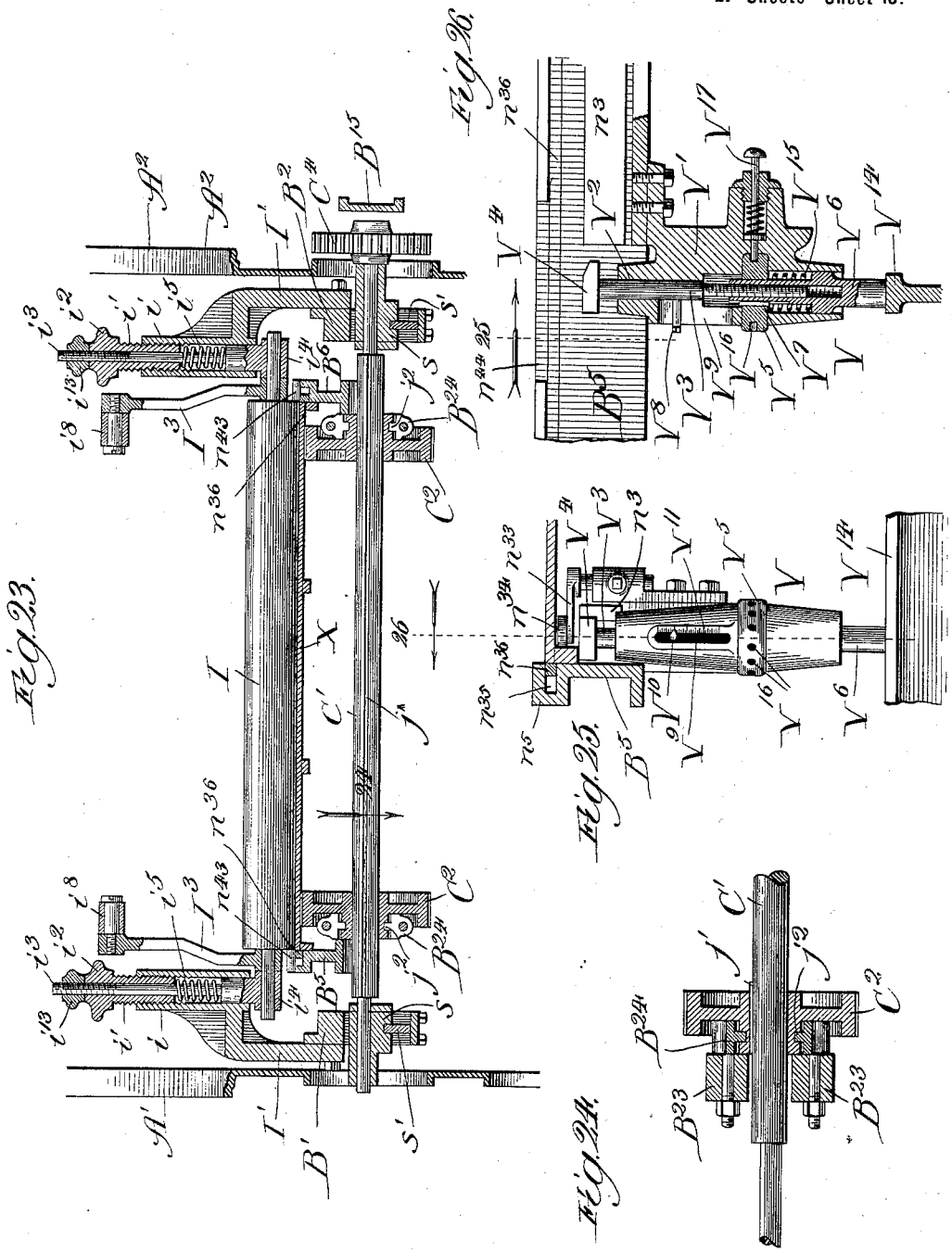

No. 608,809. Patented Aug. 9, 1898.
J. UHRI.
MACHINE FOR MAKING BOX BLANKS.
(Application filed Nov. 16, 1895.)
(No Model.) 27 Sheets—Sheet 14.
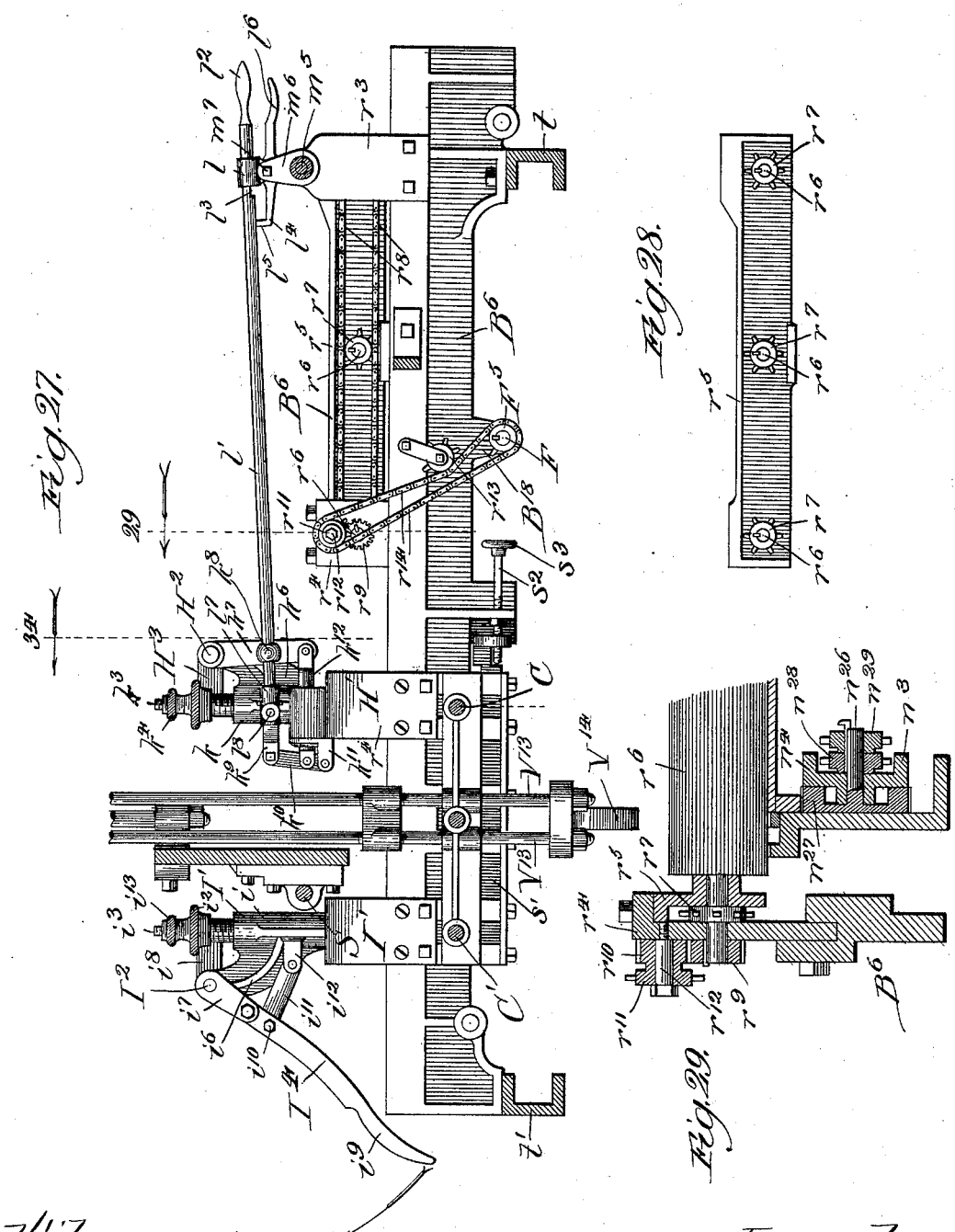

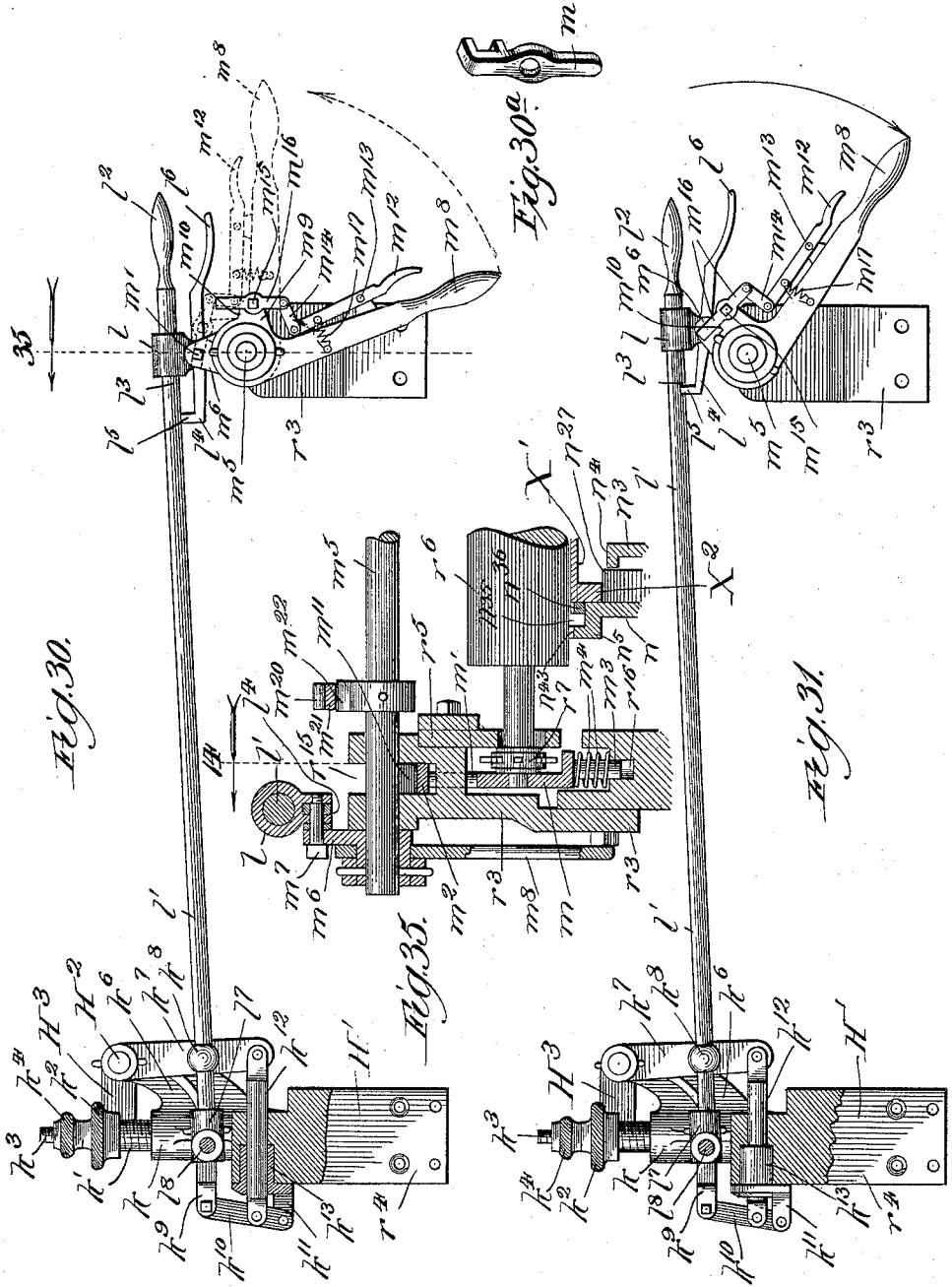

No. 608,809. Patented Aug. 9, 1898.
J. UHRI.
MACHINE FOR MAKING BOX BLANKS.
(Application filed Nov. 16, 1895.)
(No Model.) 27 Sheets—Sheet 16.
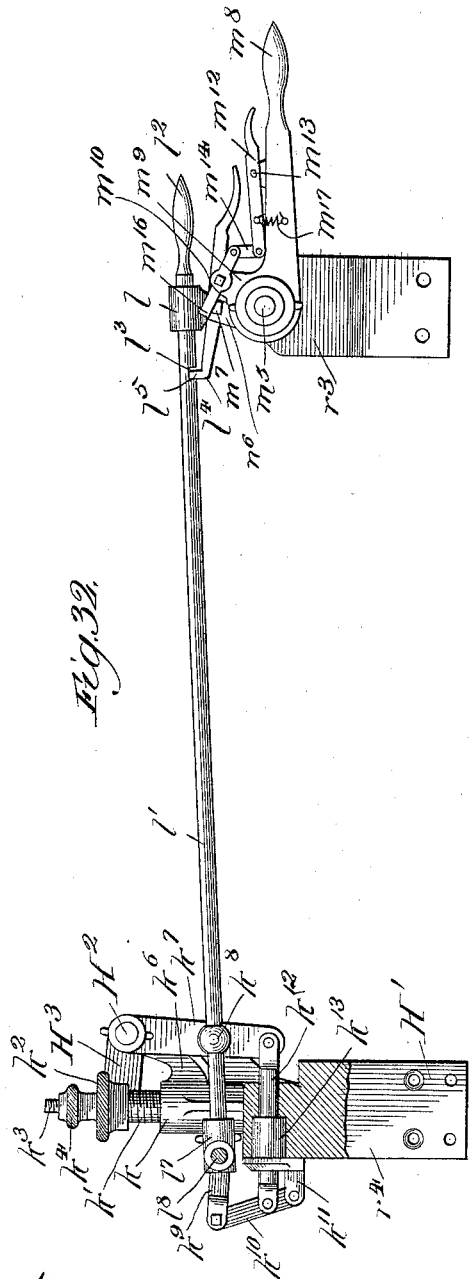
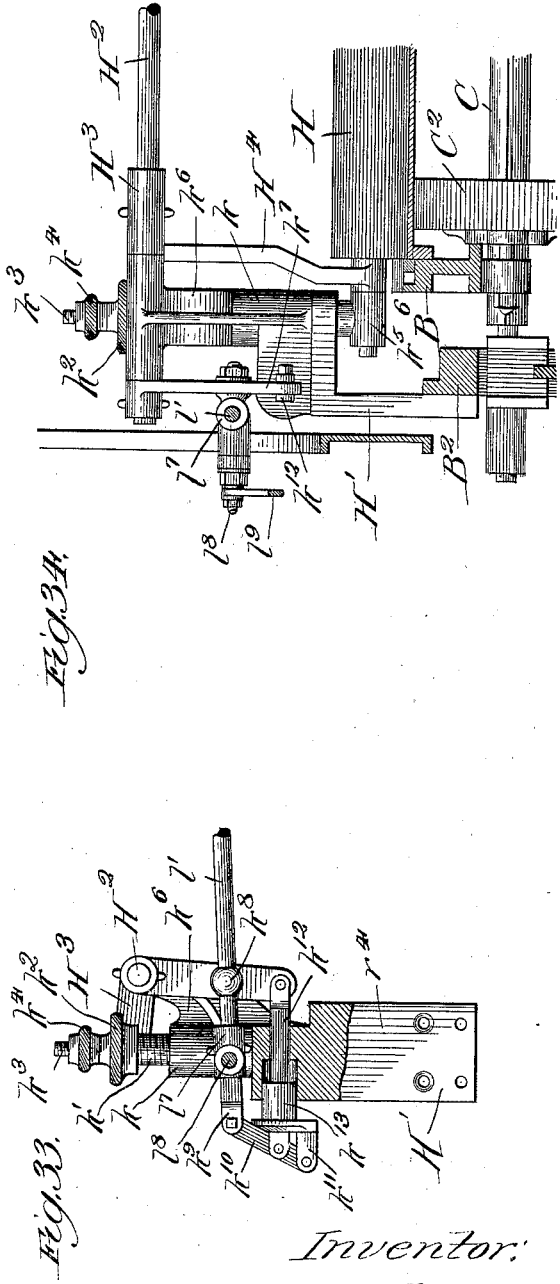
Witnesses:
Inventor:
Jacob Uhri.
By Dyrenforth & Dyrenforth
Attys.

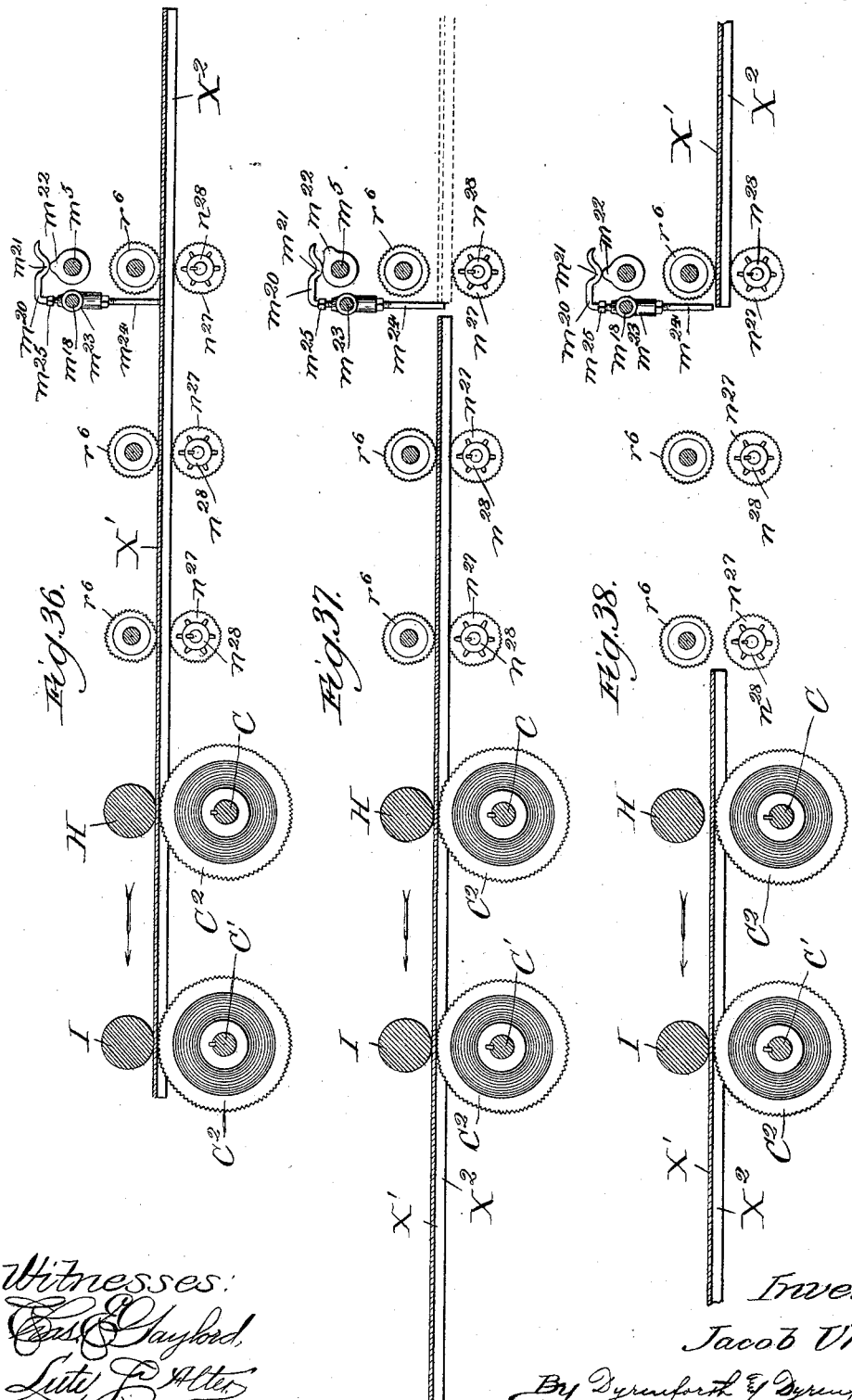

No. 608,809. Patented Aug. 9, 1898.
J. UHRI.
MACHINE FOR MAKING BOX BLANKS.
(Application filed Nov. 16, 1895.)
(No Model.) 27 Sheets—Sheet 18.
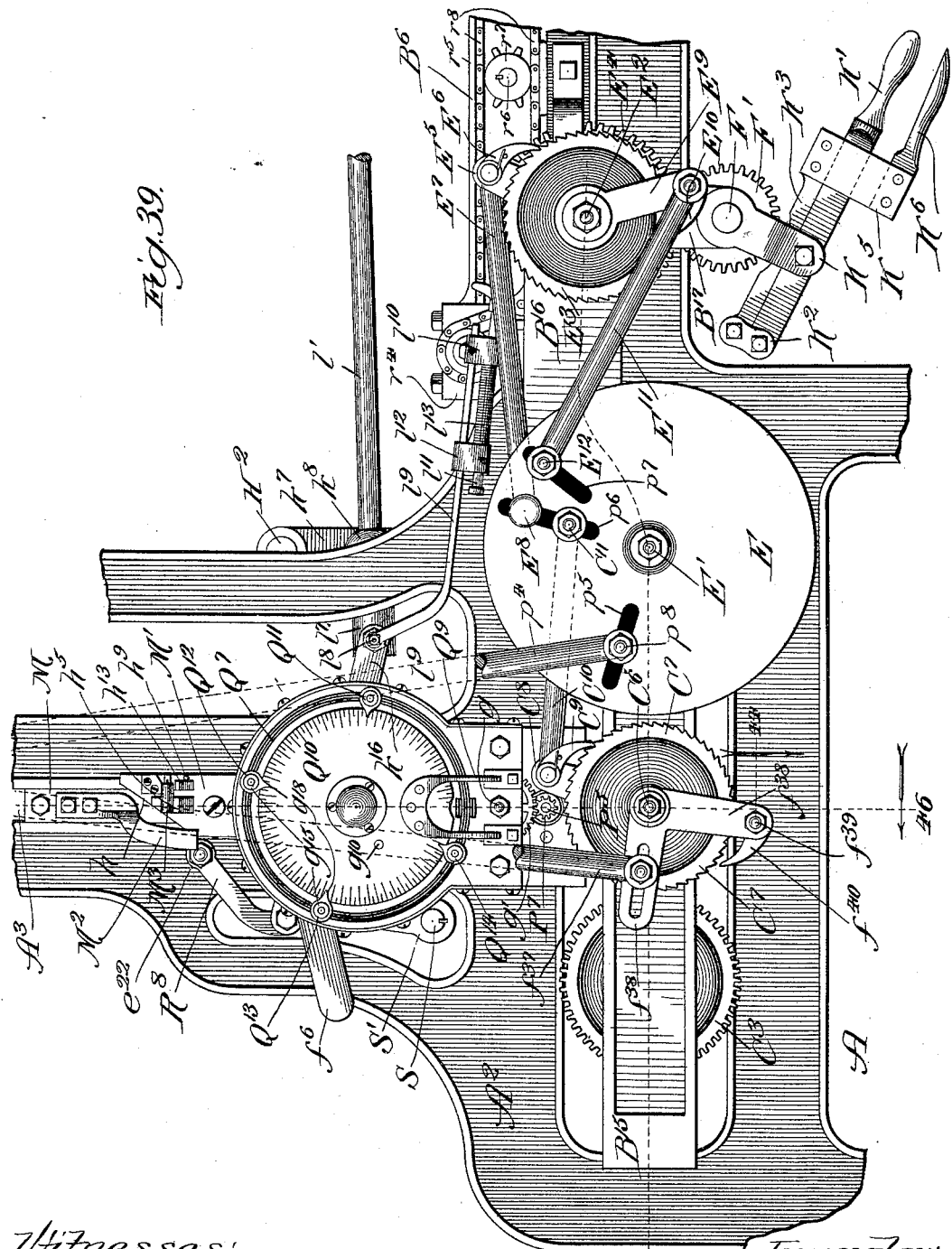
Witnesses:
Inventor:
Jacob Uhri,
By Dyrenforth & Dyrenforth,
Att'ys No. 608,809. Patented Aug. 9, 1898.
J. UHRI.
MACHINE FOR MAKING BOX BLANKS.
(Application filed Nov. 16, 1895.)
(No Model.) 27 Sheets—Sheet 19.
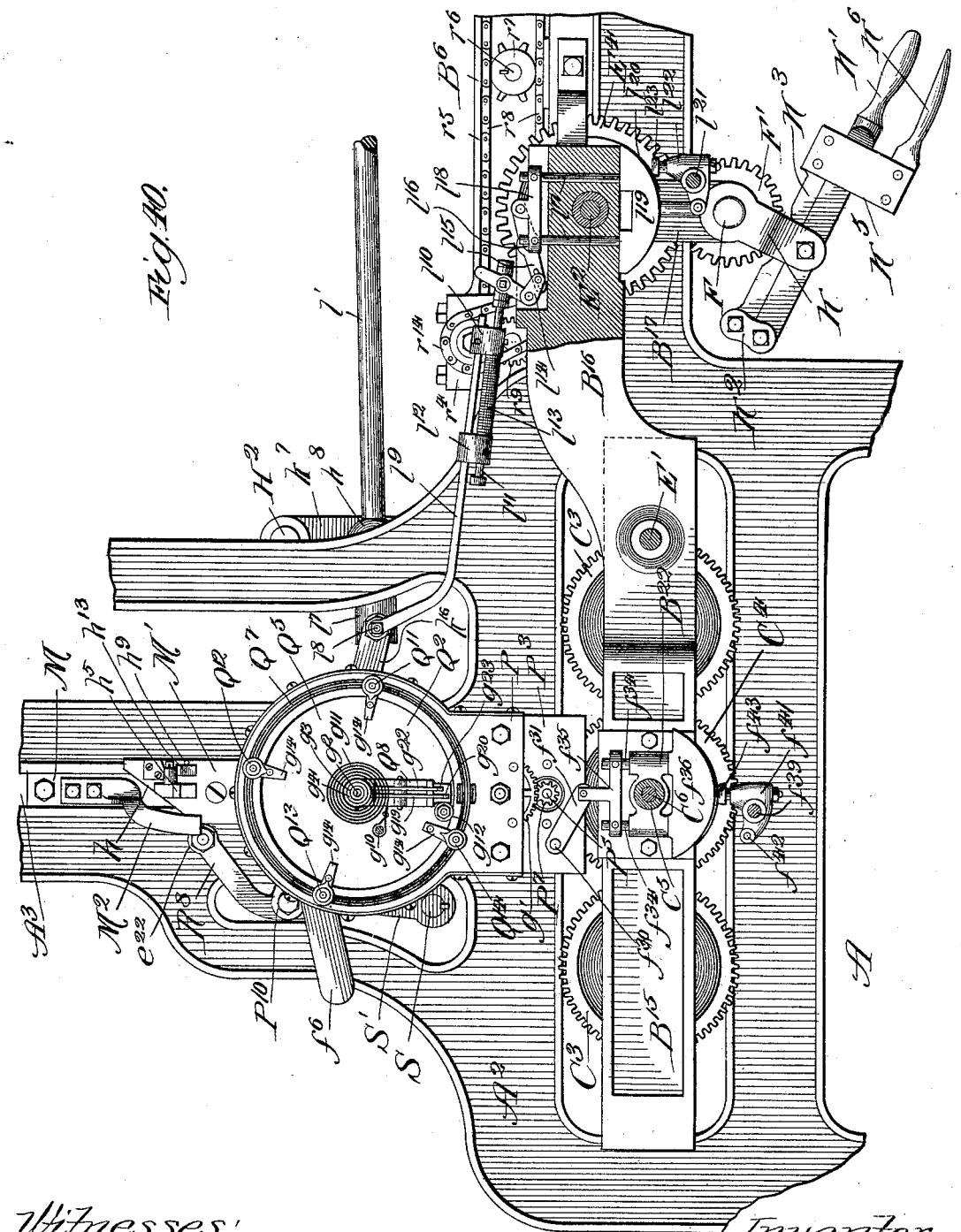
Witnesses:
Inventor,
Jacob Uhri,
By Dyrenforth & Dyrenforth,
Atty's

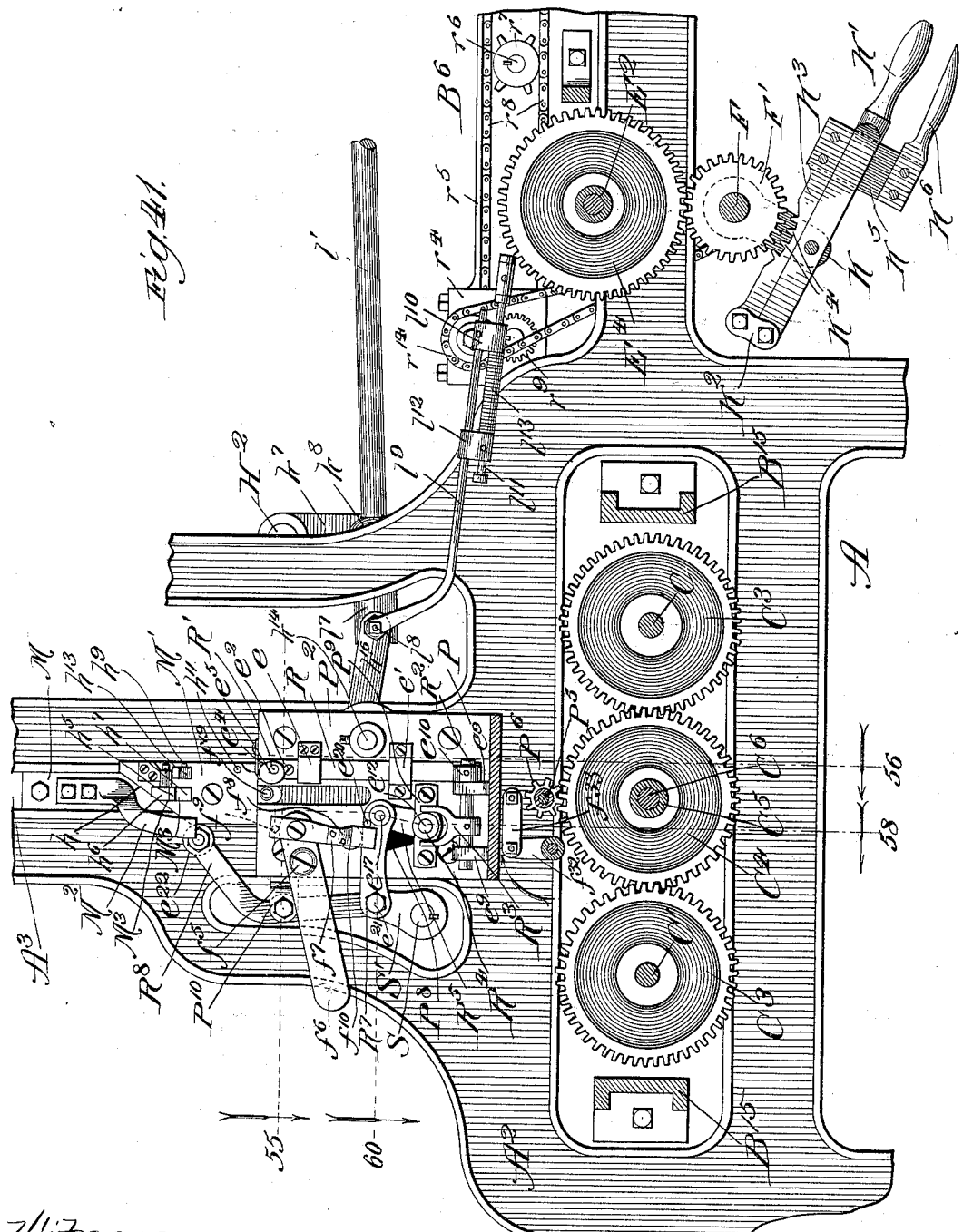

No. 608,809. Patented Aug. 9, 1898.
J. UHRI.
MACHINE FOR MAKING BOX BLANKS.
(Application filed Nov. 16, 1895.)
(No Model.) 27 Sheets—Sheet 21.
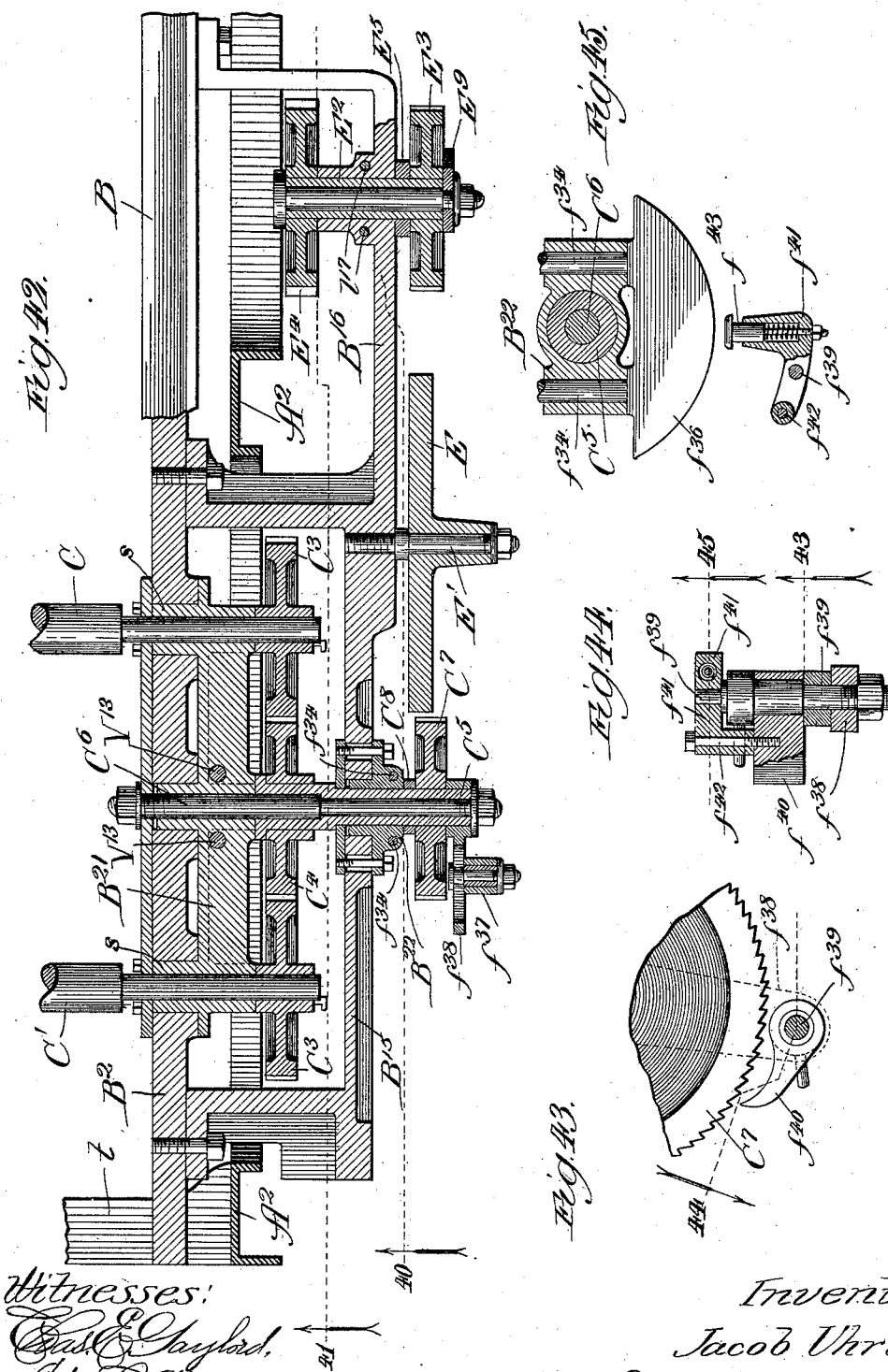
Witnesses:
Inventor:
Jacob Uhri,
By Dyrenforth & Dyrenforth,
Attys.

No. 608,809. Patented Aug. 9, 1898.
J. UHRI.
MACHINE FOR MAKING BOX BLANKS.
(Application filed Nov. 16, 1895.)

(No Model.) 27 Sheets—Sheet 22.

No. 608,809. Patented Aug. 9, 1898.
J. UHRI.
MACHINE FOR MAKING BOX BLANKS.
(Application filed Nov. 16, 1895.)
(No Model.)
27 Sheets—Sheet 23.
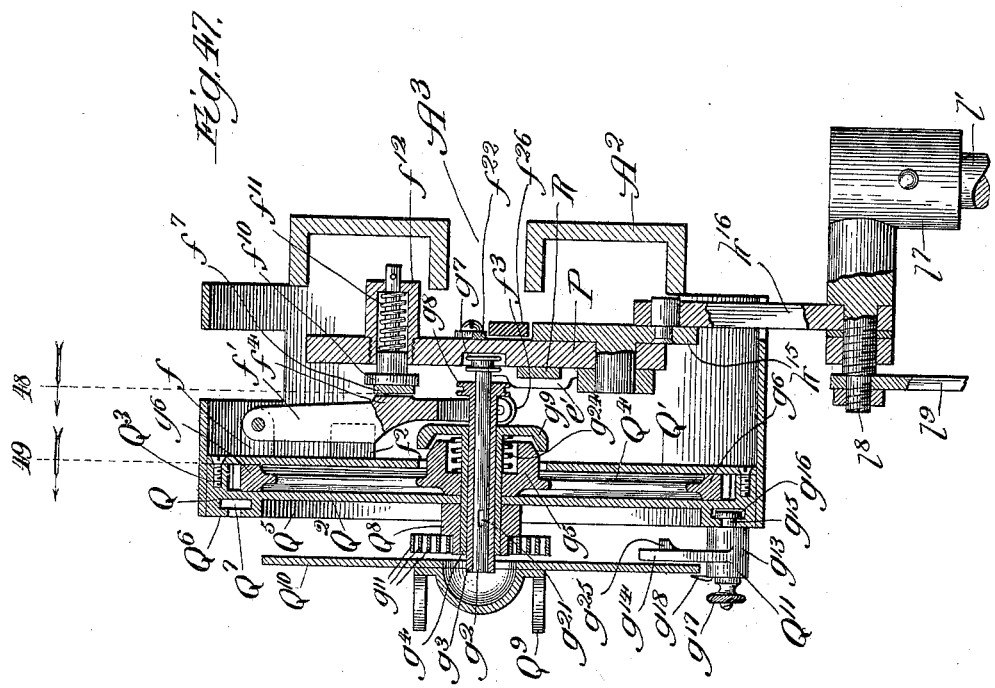
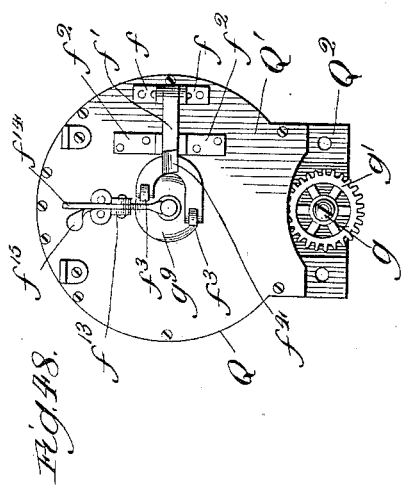
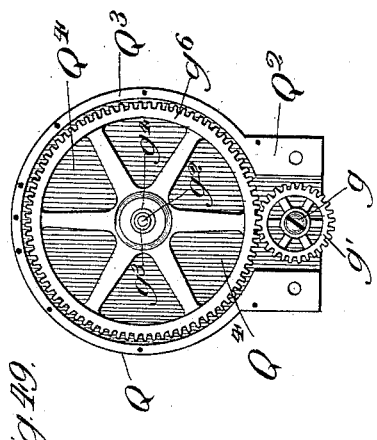
Witnesses:
Inventor:
Jacob Uhri.
By Dyrenforth & Dyrenforth
Attys No. 608,809. Patented Aug. 9, 1898.
J. UHRI.
MACHINE FOR MAKING BOX BLANKS.
(Application filed Nov. 16, 1895.)
(No Model.) 27 Sheets—Sheet 24.
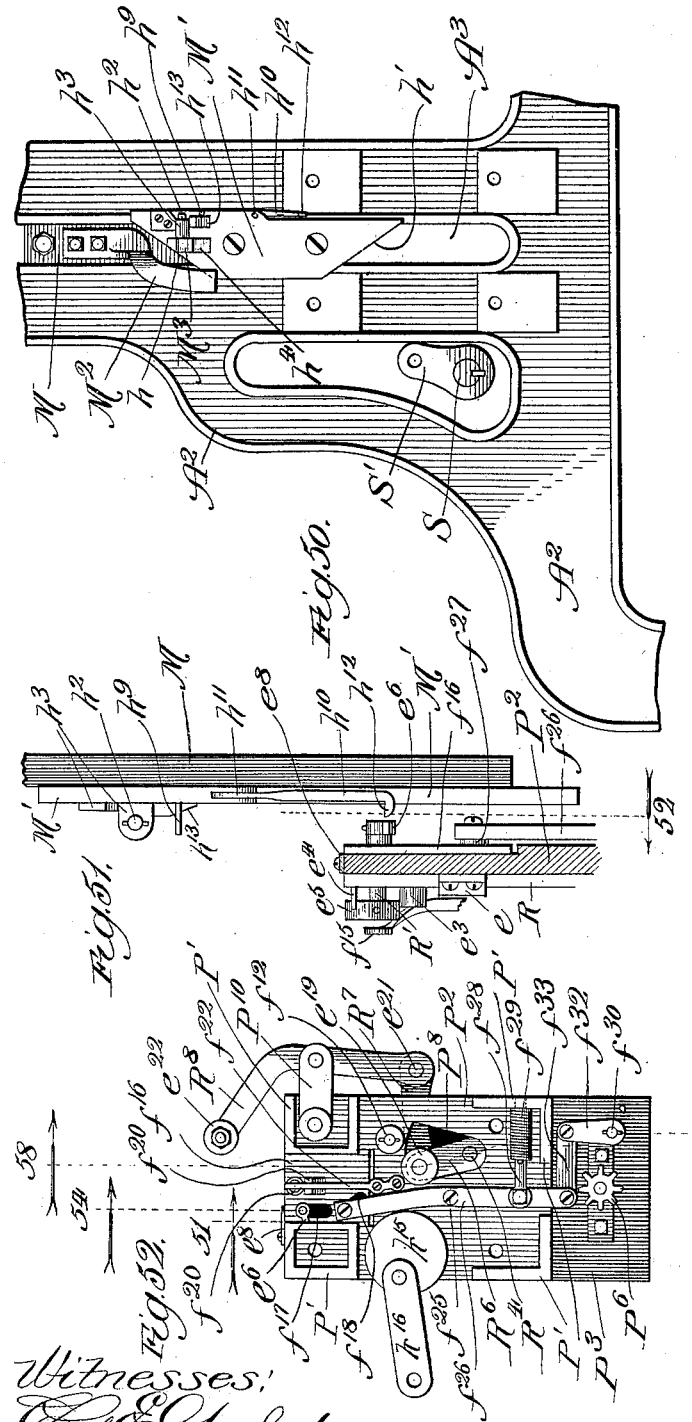

No. 608,809. Patented Aug. 9, 1898.
J. UHRI.
MACHINE FOR MAKING BOX BLANKS.
(Application filed Nov. 16, 1895.)
(No Model.) 27 Sheets—Sheet 25.
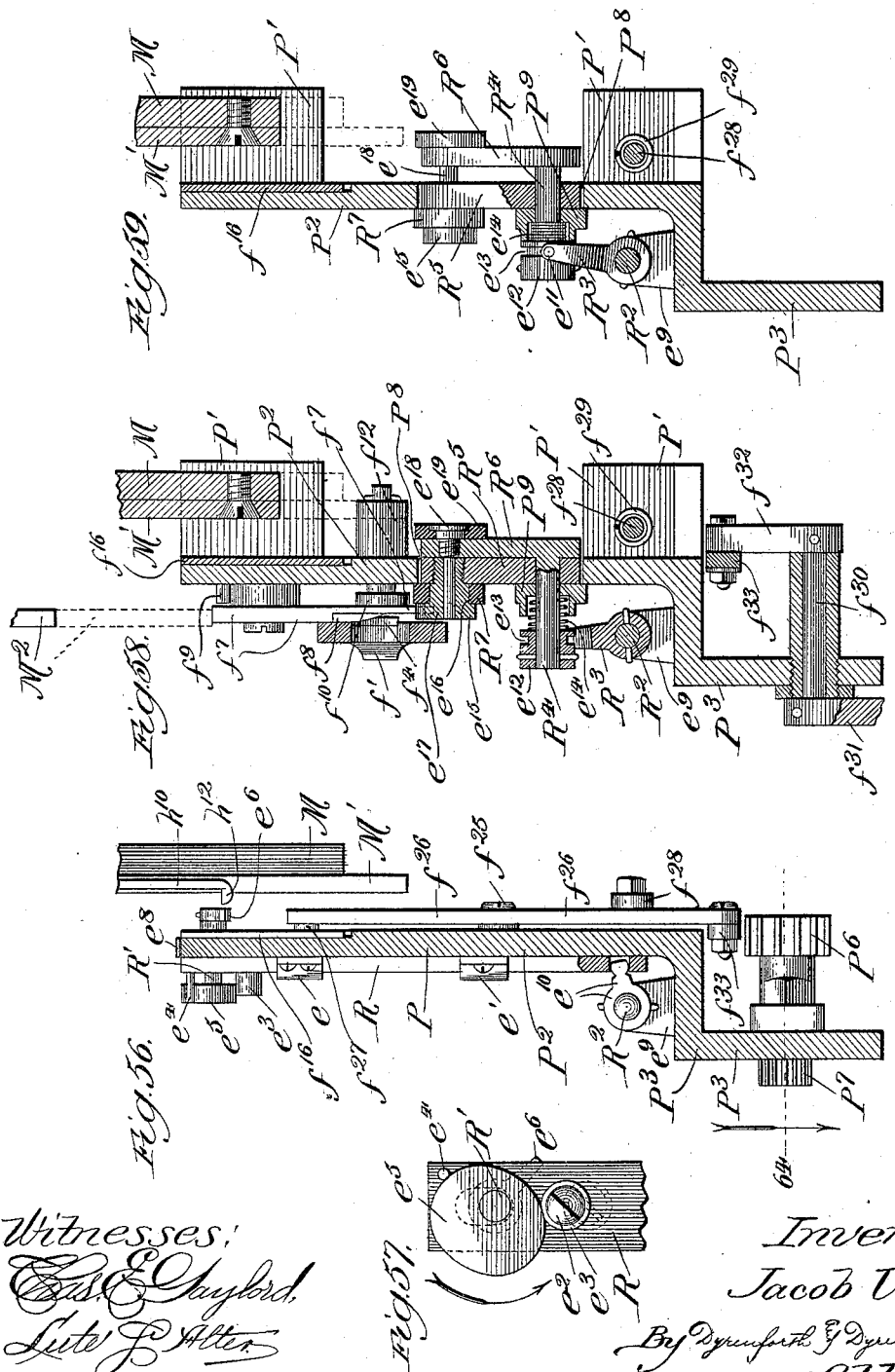
Witnesses:
Inventor:
Jacob Uhri,
By Dyrenforth & Dyrenforth,
Att'ys No. 608,809. Patented Aug. 9, 1898.
J. UHRI.
MACHINE FOR MAKING BOX BLANKS.
(Application filed Nov. 16, 1895.)
(No Model.) 27 Sheets—Sheet 26.
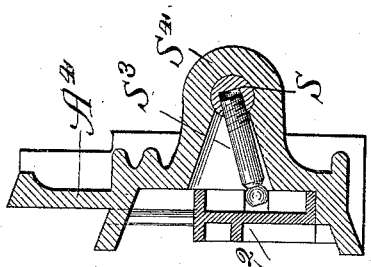
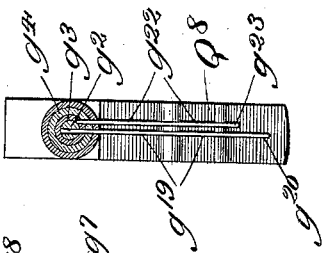
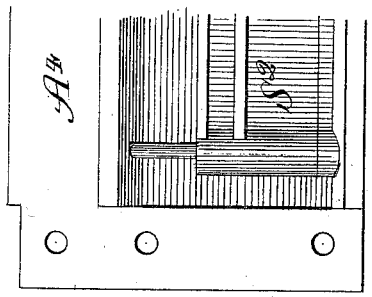
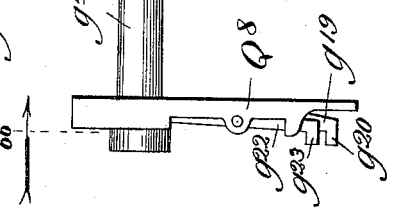
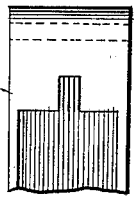
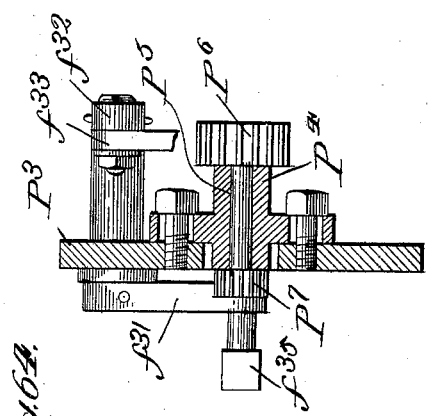
Witnesses:
Inventor,
Jacob Uhri,
By Dyrenforth & Dyrenforth,
Attys.
THE NORRIS PETERS CO., PHOTO-LITHO., WASHINGTON, D. C.

No. 608,809. Patented Aug. 9, 1898.
J. UHRI.
MACHINE FOR MAKING BOX BLANKS.
(Application filed Nov. 16, 1895.)
(No Model.) 27 Sheets—Sheet 27.
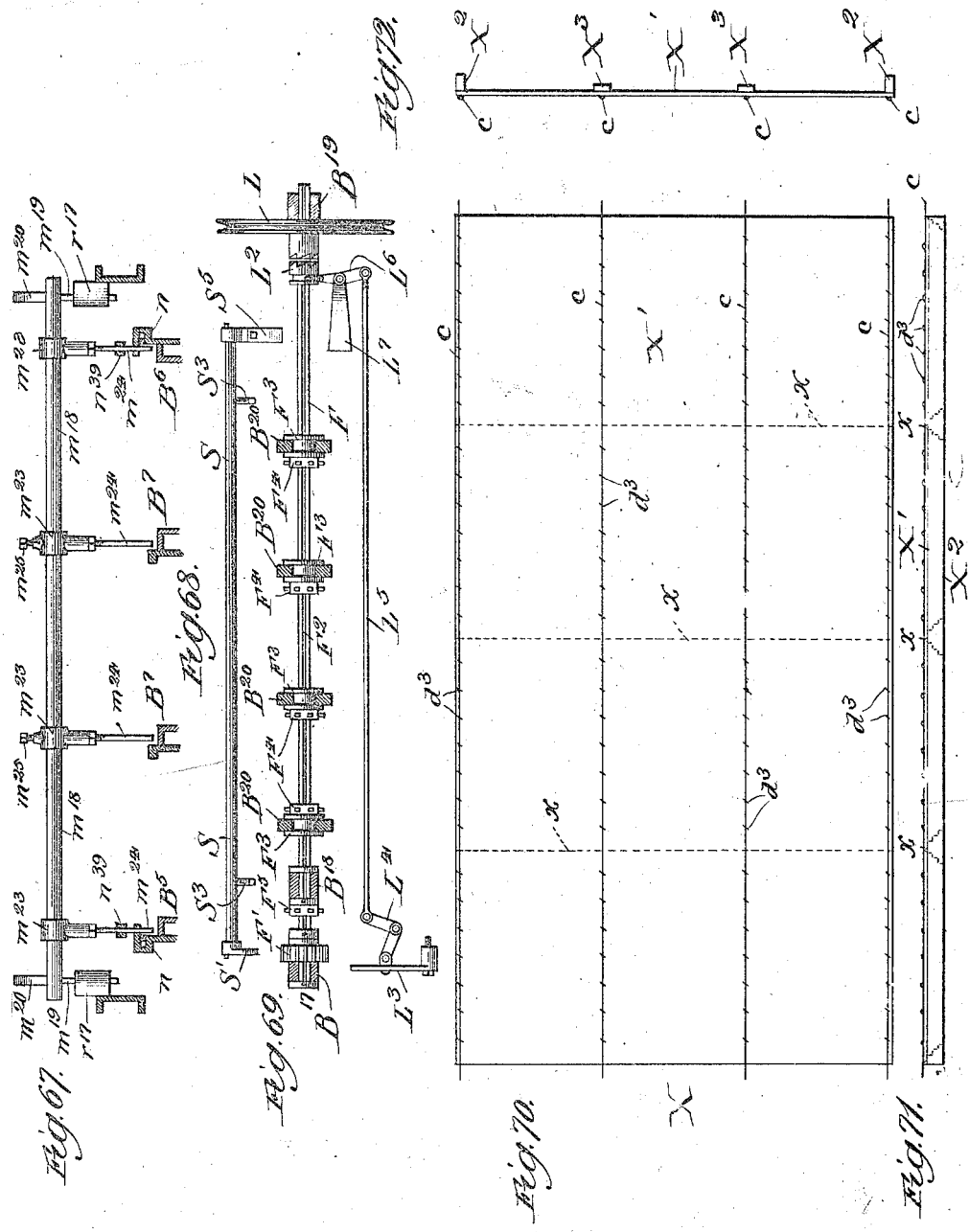
Witnesses:
Inventor:
Jacob Uhri
By Dyrenforth & Dyrenforth,
Attys

United States Patent Office.

JACOB UHRI, OF CHICAGO, ILLINOIS, ASSIGNOR TO THE WIRE BOUND BOX COMPANY, OF SAME PLACE.

MACHINE FOR MAKING BOX-BLANKS.

SPECIFICATION forming part of Letters Patent No. 608,809, dated August 9, 1898.

Application filed November 16, 1895. Serial No. 569,157. (No model.)

*To all whom it may concern:*

Be it known that I, JACOB UHRI, a citizen of the United States, residing at Chicago, in the county of Cook and State of Illinois, have invented a new and useful Improvement in Machines for Making Box-Blanks, of which the following is a specification.

This invention relates to a machine for manufacturing a certain box-blank, which is illustrated in the three last figures of the accompanying drawings. Briefly stated, the box-blank consists in a thin piece or sheet of wood provided on one face with longitudinally-extending cleats and on its opposite or outer face with strengthening-wires extending parallel with the cleats, the parts being fastened or tacked together by means of staples, which straddle the strengthening-wires and pass through the sheet into the cleats. The sheet and cleats are of a length to form the four sides of a box to be employed as a shipping-case. To permit the box to be formed, the cleats are cut away and step-mitered at the points which form the edges of the box, so that when the blank is folded the step-miters will intermesh. The strengthening-wires extend beyond opposite ends of the blank, so that when the latter is folded to form the four sides of a box it is secured in folded condition by twisting and thus fastening together the ends of the wires. The blank is formed by guiding the sheet with the cleats beneath staple forming and driving devices, which may also serve to guide the strengthening-wires.

The staple forming and driving machines or tacking devices which I prefer to employ are of the construction shown and described in Letters Patent of the United States No. 483,254, granted to T. L. Knudtson and myself as joint inventors September 27, 1892.

The staple forming and driving devices in themselves form no part of my present invention, and it will suffice to state that they each operate in the upstroke of an operating-bar to form from wire fed thereto a staple and in the downstroke of the operating-bar to drive the staple into material fed across the lower end of the device. Each device also operates to guide a strengthening-wire across its discharge end to be straddled by the staples and is provided with mechanism, termed in the patent a "switch," which when turned in one direction causes the operating-bar to actuate a strengthening-wire cutter.

My present invention is in the nature of an improvement upon a machine for making box-blanks for which Letters Patent of the United States No. 518,038 were granted to T. L. Knudtson and myself as joint inventors April 10, 1894, and while the general construction and operation of the present machine are in many respects like those of the said patented machine my present construction performs functions not performed by the other machine and also renders the machine more simple and perfect with respect to certain important details.

Owing to the fact that the present improvements involve changes over the patented construction which have resulted in an almost entirely new machine it has been found necessary to illustrate and it will also be necessary to describe the present machine for the greater part without reference to the patented machine. Those portions of the present construction which involve no material change over the construction shown in the said patents will only be touched upon sufficiently to render their general constructions and operations clear, though without making it necessary to refer to the patents above mentioned.

Like the patented machine, the present construction has a main frame consisting of sides or cheeks and cross-bars, which latter support the skeleton bed-frame, on which are mounted laterally-adjustable sheet and cleat guides. The drive-shaft extends across the rear upper portion of the frame and carries eccentrics, which at their lower ends connect with a cross-head. The staple forming and driving devices, of which there is one for each cleat-guide, are mounted upon a stationary cross-beam forming a part of the main frame and are laterally adjustable thereon. The operating-bars of the staple forming and driving devices are connected with the cross-head to be actuated thereby. The lower ends of the staple forming and driving devices are in the plane of the upper surface of the sheet as the latter passes through the machine, and mounted upon a cross-head, which is also reciprocated by means of eccentrics on the drive-shaft, are clenchers, which as staples are driven bear against the under sides of the cleats to take the impacts when the staples are driven. The sheet and cleats are placed in the guides by hand and are engaged by feed-rollers, which advance the material intermittingly through the machine in a manner to cause the material to stop in the downstrokes of the staple-drivers and move along during the upstrokes of the said devices. Thus far the present machine is, generally stated, like the said patented machine. In the operation of both machines the cleats are placed by hand into the guides and the sheet then placed thereon and all then clamped in position to move under the influence of the guide-rollers. As no material can be placed in the machine until the rear end of the material last fed has passed the first pair of feed-rollers, the material being operated upon will naturally move a greater or less distance before the next lot of material—namely, sheet and cleats—can be started.

The improvements in the present machine consist in certain changes which are adapted to render the parts better fitted in certain respects for the performance of their functions and also in certain features of novelty, which are, first, feed-accelerating mechanism which operates when the material is first fed to the machine to advance it with greater rapidity to the staple-drivers than it is afterward caused to travel intermittingly across the drivers, whereby when material is placed in the machine it may catch up with the material in advance of it; second, in sheet and cleat guides of an improved construction, rendering them readily adjustable to accommodate sheets and cleats of various sizes and which obviate all possibility of the material sticking against the force of the feed-rollers, and, third, in what I term "skipping" mechanism, which operates automatically to prevent the driving of staples at those points along the blank where the step-mitered cuts are to be made.

In the accompanying drawings many of the sectional views and more especially the principal views illustrate no more of the machine than is necessary to show up prominently the parts which it is desired to describe together and in connection with the respective figures. The parts which might be shown in but are left out of the figures referred to are fully illustrated, with their connections, in other figures. This plan avoids unnecessary repetition of details and, it is thought, tends, so many figures being necessary, to prevent confusion.

All the sections referred to in the following description are views in the directions of the arrows at the dotted lines on which the sections are taken.

Figure 4:
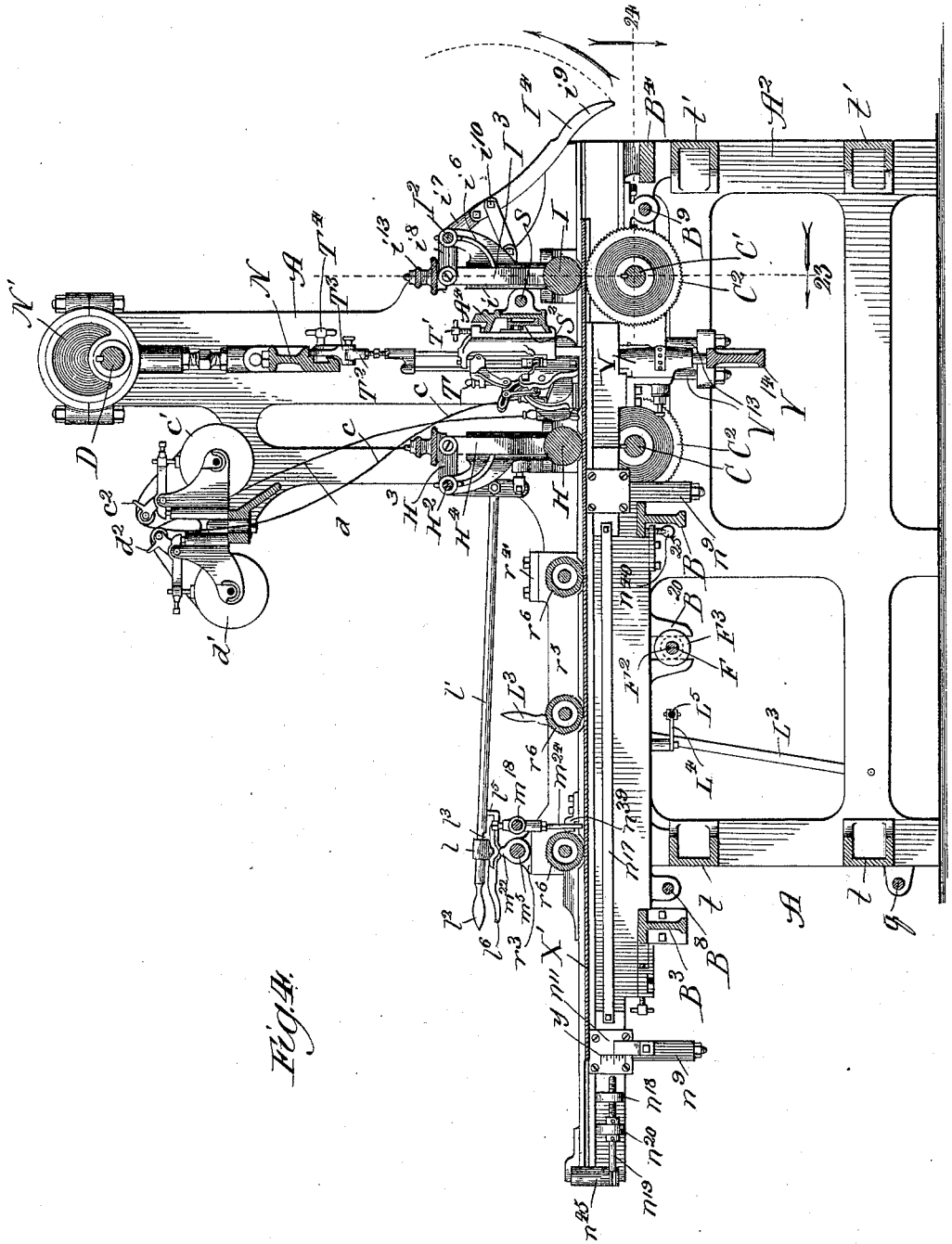
Figure 6:
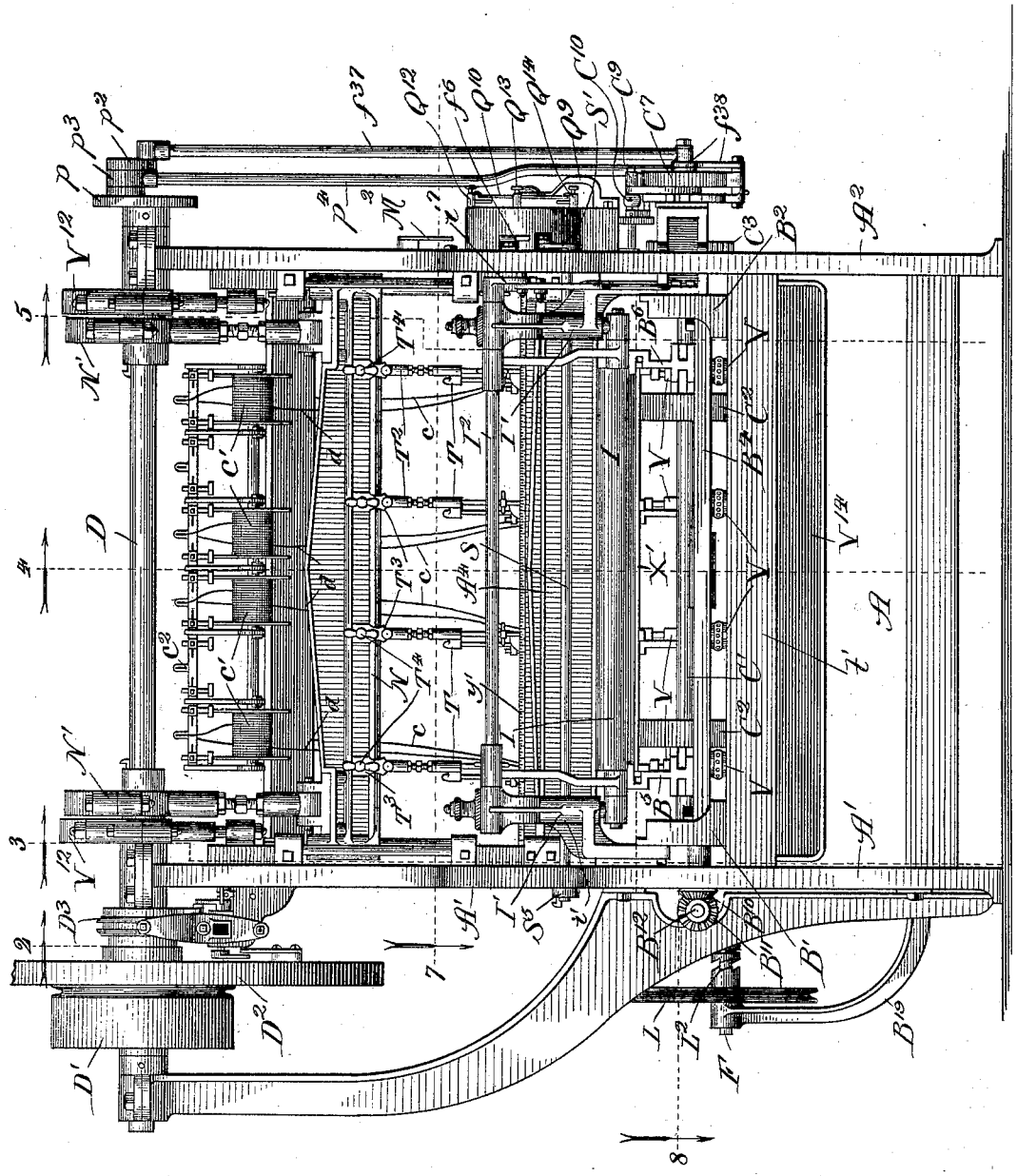
Figure 7:
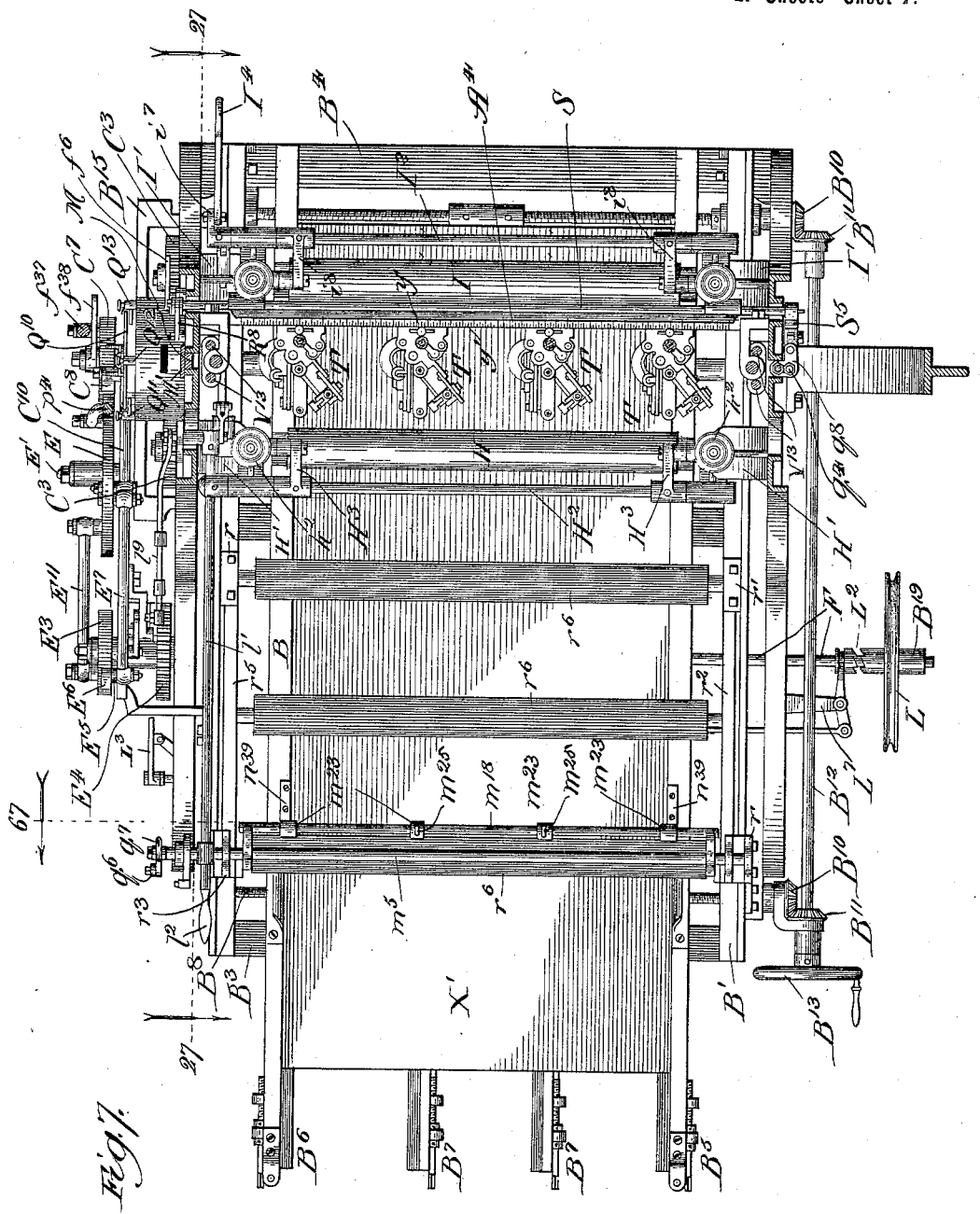
Figure 46:
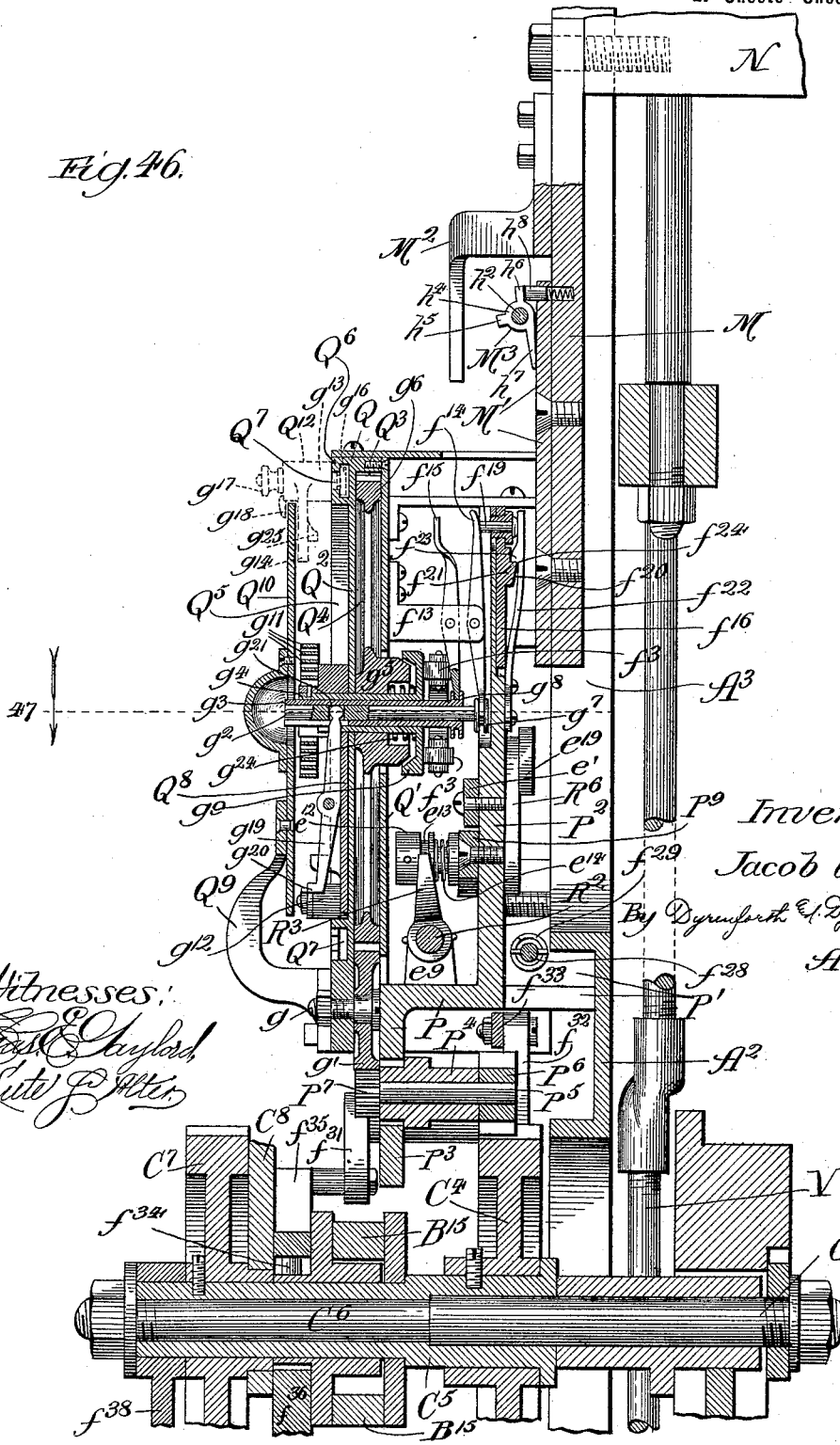

Referring to the drawings, Figure 1 is a broken view in elevation of the right-hand side of the machine; Figs. 2, 3, 4, and 5, sectional elevations taken, respectively, on lines 2, 3, 4, and 5 of Fig. 6, which latter is a view in elevation of the rear end of the machine; Figs. 7 and 8, plan sections taken, respectively, on lines 7 and 8 of Fig. 6; Fig. 9, a view in elevation of the left-hand side of the machine; Fig. 10, a detail view, partly broken and partly in section, of the outer side of the right-hand supporting-rail of the bed-frame which supports the sheet and cleat guides and the feed-rollers, the section being taken on line 10 of Fig. 8; Fig. 11, a similar view of the inner side of the same rail, the section being taken on line 11 of Fig. 8; Fig. 12, a broken plan section taken on line 12 of Fig. 10; Fig. 13, a broken sectional elevation taken on line 13 of Fig. 12; Fig. 14, an enlarged broken sectional detail of the upper forward end portion of the said side rail, the section being taken on line 14 of Fig. 35; Fig. 15, a section of the bed-frame, taken on line 15 of Fig. 8 and showing in elevation the outer side of a laterally-adjustable outer guide-rail affording the guide for one of the cleats and for one edge of the sheet; Fig. 16, the inner side of the same rail, the view being an elevation taken from line 16 of Fig. 8 and showing certain shafts and bolts in section; Fig. 17, a broken elevation of the guide-rail shown in Fig. 15 with certain parts removed to expose details of construction which are hidden in Fig. 15; Figs. 18, 19, 20, and 21, enlarged sections taken, respectively, on lines 18, 19, 20, and 21 of Fig. 15, showing details of construction; Fig. 22, an enlarged broken section taken on line 22 of Fig. 8 and showing one or two companion adjusting-screws or screw-shafts for moving the outer guide-rails laterally toward or away from each other on the bed-frame; Fig. 23, a broken and enlarged section taken on line 23 of Fig. 4; Fig. 24, a broken plan section on line 24 of Figs. 4 and 23, illustrating the manner of mounting the four lower rear feed-wheels; Fig. 25, an enlarged broken section taken on line 25 of Figs. 8 and 26, showing one of the outer sheet and cleat guides and one of the adjustable reciprocating staple-clenchers; Fig. 26, an enlarged broken section taken on line 26 of Fig. 25; Fig. 27, an enlarged broken sectional view taken on line 27 of Fig. 7, just inside of the cheek of the main supporting-frame, at the left hand of the machine; Fig. 28, a detached view of one of the details shown in Fig. 27; Fig. 29, an enlarged broken section taken on line 29 of Fig. 27; Figs. 30, 31, and 32, broken sectional detail elevations of feed-regulating mechanism detached from the machine, showing the same in different adjusted positions; Fig. 30ª, a perspective view of a lever forming one of the details in the last preceding figures; Fig. 33, a broken sectional detail view of a part of the mechanism shown in the last-named figures in still another position; Fig. 34, an enlarged broken sectional view taken on line 34 of Fig. 27; Fig. 35, a broken and enlarged section taken on line 35 of Fig. 30; Figs. 36, 37, and 38, detail views of the rollers which feed the material—that is to say, the sheet and cleats—through the machine, the positions of the relatively-adjustable parts being governed by the adjustment of the mechanism shown in Figs. 30, 31, and 32; Fig. 39, an enlarged broken side elevation of the rear end portion of the left-hand side of the machine; Fig. 40, a view nearly the same as Fig. 39, with parts removed to show details which are hidden in Fig. 39, the view being a section taken on line 40 of Fig. 42; Fig. 41, a view nearly the same as Fig. 40, but with still other parts removed, the section being taken on line 41 of Fig 42; Fig. 42, a broken plan section taken on the irregular line 42 of Fig. 39; Fig. 43, a still further enlarged broken sectional detail of pawl-and-ratchet mechanism shown in Fig. 39, the section being taken on line 43 of Fig. 44; Fig. 44, a broken plan section of the pawl shown in Fig. 43, the section being taken on line 44 of Figs. 39 and 43; Fig. 45, a broken vertical section taken on line 45 of Fig. 44 and showing a part of the said pawl and of a movable segmental guide which when lowered causes the pawl to engage the ratchet-wheel shown in Fig. 43; Fig. 46, a broken and enlarged vertical section taken on line 46 of Fig. 39; Fig. 47, a broken plan section taken on line 47 of Fig. 46; Fig. 48, a detail view in elevation, showing the inner face of a supporting-plate mounted just behind the dial-plate shown in Figs. 39 and 46 and showing more especially friction clutch mechanism, the view being on a reduced scale, taken from line 48 of Fig. 47; Fig. 49, a detail view of mechanism mounted between the dial-plate and the mechanism illustrated in Fig. 48, the view being taken on a reduced scale from line 49 of Fig. 47; Fig. 50, a broken elevation of a portion of the rear end of the left-hand side of the machine, showing the cheek of the main frame and parts carried upon the end of a vertical reciprocating beam which actuates the staple forming and driving devices. The view is taken from line 52 of Fig. 51 in the direction opposite that indicated by the arrow and on a reduced scale. Fig. 51 is a broken vertical section illustrating a portion of the strengthening-wire-severing mechanism, the section being taken on line 51 of Fig. 52; Fig. 52, a view in elevation, taken on line 52 of Fig. 51 and viewed in the direction of the arrow and reduced; Fig. 53, an enlarged elevation of the inner side of a plate detail forming part of the mechanism shown in Fig. 52; Fig. 54, an enlarged section taken on line 54 of Fig. 52; Fig. 55, a broken and enlarged plan section taken on line 55 of Fig. 41; Fig. 56, an enlarged broken section taken on line 56 of Fig. 41; Fig. 57, a broken view of mechanism shown in Fig. 56, but on an enlarged scale; Fig. 58, a broken and enlarged section taken on line 58 of Figs. 41 and 52; Fig. 59, a view the same as Fig. 58, but showing movable parts in another position; Fig. 60, an enlarged broken plan section taken on line 60 of Fig. 41; Fig. 61, a broken view in elevation of one end portion of a stationary horizontal cross-bar, forming a part of the main frame of the machine, and a movable bar thereon; Fig. 62, a vertical section taken on line 62 of Fig. 60; Fig. 63, a broken view in elevation of one end portion of a horizontally-extending vertical reciprocating bar, forming a detail of the mechanism shown in Figs. 61 and 62, this view showing the reverse side of the said bar; Fig. 64, a plan sectional view taken on line 64 of Fig. 56; Fig. 65, a detail view, in side elevation, of mechanism illustrated in Fig. 47; Fig. 66, a section taken on line 66 of Fig. 65; Fig. 67, a cross-sectional view showing details of stop mechanism for the material to be worked upon, the section being taken on line 67 in Figs. 7 and 15; Fig. 68, a plan view of a rock-shaft which reciprocates the movable plate shown in Fig. 62, said parts having to do with the strengthening-wire-severing mechanism; Fig. 69, a section showing a detail plan view of the shaft which operates the forward feed-rollers and wheels and shipping mechanism for throwing the said shaft into and out of engagement with the main driving-shaft of the machine; Fig. 70, a top plan view of a box-blank which the machine is designed to manufacture; Fig. 71, a side elevation of the blank, showing by dotted lines where the cleats are to be cut away by a step-miter machine to which the blank is fed after it leaves the present machine; and Fig. 72, an end elevation of the blank.

A is the stationary frame of the machine, formed with side frames or cheeks $A'$ $A^2$, which are joined by front cross-bars $t$ and rear cross-bars $t'$.

B is the stationary bed-frame, which rests upon the upper cross-bars $t$ $t'$ and is secured rigidly in place. The bed-frame is formed with stationary side rails $B'$ $B^2$, a front cross-bar $B^3$, a rear cross-bar $B^4$, and an intermediate bar $B^{25}$. Resting on the cross-bars $B^3$ $B^4$ are laterally-adjustable right-hand and left-hand outer sheet and cleat guides $B^5$ $B^6$, respectively, and laterally-adjustable intermediate cleat-guides $B^7$. Journaled at opposite ends in the guide-rails $B'$ $B^2$ are horizontal right and left hand screw-shafts, (see, for example, Figs. 8 and 22,) one of which, $B^8$, is adjacent to the cross-bar $B^3$, and the other of which, $B^9$, is adjacent to the cross-bar $B^4$. Beyond the cheek $A'$ the screw-shafts $B^8$ $B^9$ carry beveled gears $B^{10}$ $B^{10}$, which mesh with beveled gears $B^{11}$ on a shaft $B^{12}$, journaled in bearings on the right-hand side of the frame and provided with a hand-wheel $B^{13}$. The screw-shafts pass through threaded bearing-nuts $B^{14}$ on the under sides of the guides $B^5$ $B^6$, and the operation is such that by turning the hand-wheel $B^{13}$ the screw-shafts are turned simultaneously to cause the right and left hand guides B⁵ B⁶ to slide laterally on the bars B³ B⁴ and approach or recede from each other in parallel planes.

Journaled at opposite ends in the side frames B' B² are shafts C C', each carrying a pair of what I term "secondary" feed-rollers or feed-wheels C². The shafts C C' are journaled at their opposite ends in blocks $s$, set in guide-recesses in the side bars and forming parts of vertically-adjustable yokes B²¹, the said blocks being provided at their under sides with beveled faces, at which they rest upon beveled edge portions or cam-faces on longitudinally-sliding bars $s'$, mounted in the said side frames, as shown in Figs. 10, 11, 12, 13, and 23. The sliding bars $s'$ are moved by screws $s^2$ on the under sides of the side bars and provided with hand-wheels $s^3$, whereby when the screws are turned in one direction the bars $s'$ are advanced and the yokes at their end blocks $s$ are permitted to slide down the cam-surfaces to lower the shafts C C' simultaneously, and whereby when the screws are turned in the opposite direction the bars $s'$ are retracted and raise the yokes B²¹ in their guides to raise the shafts C C' simultaneously.

On the side bar B⁵ are upward-extending brackets $r\,r'$, in which is removably fastened toward opposite ends a longitudinally-extending bar or plate $r^2$, (see Fig. 3,) and on the side bar B⁶ (see Fig. 5) are upward-extending brackets $r^3\,r^4$, corresponding in relative position with the brackets $r\,r'$ and having adjustably secured thereto a longitudinally-extending bar or plate $r^5$. The plates $r^2\,r^5$ afford bearings for the opposite ends of upper forward feed-rollers $r^6\,r^6\,r^6$, which at their journals on one side pass through the plate $r^5$, where they are provided (see Figs. 27, 29, and 35) with sprocket-wheels $r^7$, all geared together to move in unison by means of a drive-chain $r^8$. The shaft of the rear feed-roller $r^6$ passes beyond the bracket $r^4$, as shown in Figs. 27 and 29, and there carries a pinion $r^9$, which meshes with a pinion $r^{10}$, integral with a sprocket-wheel $r^{11}$, and journaled on a pin or bolt $r^{12}$ on the bracket $r^4$.

D is the main drive-shaft of the machine, upon which is mounted a driver for the shaft in the form of a pulley D' and fly-wheel D². The pulley and drive-wheel are loose upon the shaft, and the inner face of the hub of the drive-wheel forms a clutch member adapted to be engaged by a sliding clutch member D³, which is feathered upon the shaft D. The means for moving the sliding clutch member to carry it into or out of engagement with the constantly-rotating clutch member on the fly-wheel consist of a rock-shaft $q$, journaled in the lower forward edges of the cheeks of the main frame and extending across the lower front portion of the machine. On the right-hand end of the rock-shaft $q$, (see Figs. 1 and 2,) beyond the cheek A', is a crank $q'$, pivotally connected to one end of a thrust-bar $q^2$, which at its opposite end is pivotally connected to a bell-crank lever $q^3$, fulcrumed at the lower edge of the cheek A'. Pivotally connected with the bell-crank lever $q^3$ is a vertically-movable rod $q^4$, which at its upper end connects with the sliding clutch member and operates when it is drawn in the downward direction to produce engagement between the clutch members and when raised to disengage the clutch members. The clutch and mechanism for operating it are substantially the same as in the patent above referred to, and as no claim will be made thereto in the present application it is not thought necessary to give a more detailed description.

On the left-hand end of the rock-shaft $q$ (see Fig. 9) just beyond the cheek A² of the machine is a crank $q^5$, to which a rod $q^6$ is pivotally connected at its lower end. At its upper end the rod $q^6$ connects with a bell-crank lever fulcrumed on the cheek A² and having one of its arms formed into a handle $q^7$. Movement of the handle $q^7$ to the left in Fig. 9 operates through the rod $q^6$, crank $q^5$, rock-shaft $q$, crank $q'$, rod $q^2$, bell-crank $q^3$, and rod $q^4$ to move the sliding clutch member D³ into engagement with the fly-wheel and drive-pulley, whereby the machine is started, and movement of the handle $q^7$ to the right in Fig. 9 operates with the same rods and levers to disengage the sliding clutch member from the fly-wheel and pulley, and thus causes the machine to stop. On the end of the drive-shaft D, beyond the cheek A², is a disk $p$, (see Figs. 6 and 9,) provided with an eccentric-pin $p'$, provided on its outer end with a crank $p^2$. Surrounding the pin between the crank and disk is a loose ring or collar $p^3$, to which is connected a plunger-rod $p^4$. On the left-hand side of the bed-frame and extending through an opening in the cheek B² to the outer side of the latter is a horizontal longitudinally-extending bracket B¹⁵, forming a stationary and practically integral part of the bed-frame. (See Figs. 8, 9, 39, and 42.) Extending forward from the bracket B¹⁵ to be substantially integral therewith and also secured to the bed-frame B is a bracket B¹⁶.

E is a rocking disk journaled upon a pin E' on the outer face of the bracket B¹⁵. (See Fig. 42.) Extending through the disk E in the relative positions shown—for example, in Fig. 9—are radial slots $p^5\,p^6\,p^7$. The plunger-rod $p^4$ is pivotally connected at its lower end with a bolt $p^8$, adjustably fastened in the slot $p^5$ of the disk E. In the rotation of the drive-shaft D and consequent rotation of the disk $p$ and its eccentric-pin $p'$ the plunger-rod $p^4$ is reciprocated longitudinally and rocks the disk E on the pin or shaft E'. Extending through and journaled in the bracket B¹⁶ is a rotary sleeve E² on a stationary shaft or pin and carrying on its outer end a ratchet-wheel E³ and on its inner end a gear-wheel E⁴. (See Figs. 9, 39, and 42.) On the inner side of the ratchet-wheel E³ and pivoted upon the sleeve E² to swing thereon is a short arm E⁵, carrying a pawl E⁶, which normally engages the ratchet-wheel E³. The arm E⁵ at its free end is pivotally connected to the end of a thrust-bar $E^7$, which at its opposite end is pivotally connected to a bolt $E^8$, adjustably secured in the radial slot $p^6$ of the disk E. On the outer side of the ratchet $E^3$ is an arm $E^9$, pivotally mounted upon the shaft which is surrounded by the sleeve $E^2$ and carrying at its free end a pawl $E^{10}$, and pivotally connected with the free end of the arm $E^9$ is a plunger-rod $E^{11}$, which at its opposite end is pivotally connected to a bolt $E^{12}$, adjustably secured in the slot $p^7$ of the disk E. The pawl $E^{10}$ is normally out of engagement with the ratchet-wheel $E^3$ and is only brought into engagement therewith when it is desired to feed at increased speed, as hereinafter described.

F is the feed-shaft or shaft which drives the feed-rollers which move the material to the staple forming and driving devices T. The shaft F is journaled at the side $A^2$ of the machine in a hanger $B^{17}$, forming an integral part of the bracket $B^{16}$, and a hanger $B^{18}$ on the side rail $B^2$, (see Figs. 2 and 3,) and a bracket $B^{19}$ on the cheek A. (See Figs. 1 and 6.) On the shaft F at the bearing $B^{17}$ is a pinion $F'$, which meshes with the gear-wheel $E^4$, and from the bearing $B^{18}$ nearly to its opposite end the shaft F is provided with a longitudinal feather-groove $F^2$. (See Figs. 8 and 69.) On the shaft F are sliding peripherally-grooved collars $F^3$, each provided with a small sprocket-wheel $F^4$. The collars and sprocket-wheels are feathered upon the shaft to revolve therewith. The guide-bars $B^5$ $B^6$ $B^7$ are provided on their under sides with rigid downward-extending bifurcated lugs $B^{20}$, which loosely embrace the collars $F^3$ in the grooves of the latter, whereby in the lateral adjustment of the guide-bars, as hereinafter described, the collars and pinions are moved along the shaft with the guide-bars. On the shaft F adjacent to the hanger $B^{18}$ is a sprocket-wheel $F^5$, (see Fig. 27,) and carried by a short hanger on the side rail $B^6$ is an idle sprocket-wheel $r^{13}$. Passing around the sprocket-wheel $F^5$ and under the idle sprocket-wheel $r^{13}$ and over the sprocket-wheel $r^{11}$ is a drive-chain $r^{14}$, which transmits power from the shaft F, through the pinions $r^{10}$ $r^9$, to the upper rear feed-roller $r^6$, and thence, through the medium of the drive-chain $r^8$, to the other upper feed-rollers $r^6$.

Each cleat-guide $B^5$, $B^6$, and $B^7$ consists, broadly stated, in a side plate $n$ of irregular width, but L-shaped in cross-section throughout the greater part of its extent (see Fig. 19) to produce the vertical side portion $n'$ and horizontal base $n^2$, and a bar $n^3$, adjustable with reference to the bar $n$ and L-shaped at opposite end portions. The shape of the bar $n^3$ in side elevation is plainly shown in Fig. 16. The bar $n^3$ has a flat top $n^4$, affording a guide-surface for the under side of a cleat when fed to the machine. The bar $n$ has a longitudinal laterally-projecting flange $n^5$ at its upper edge, the said flange affording on its under side a guide-surface $n^6$ for a purpose hereinafter described. Toward opposite end portions of the bar $n^3$ are downward-extending pins $n^7$, which pass through openings in guide-lugs $n^8$ on the bar $n$, and sliding at their upper end portions in guides on the outer face of the bar $n$ are vertically-adjustable arms or hangers $n^9$, having flanges $n^{10}$ at their lower ends, provided with guide-openings for the lower end portions of the pins $n^7$. The guides for the outer sides of the arms $n^9$ are afforded by plates $n^{11}$, secured to the bar $n$. The plate $n^{11}$ toward the forward end of the machine may be marked with a scale $y$, as shown toward the left in Fig. 15, and the arm $n^9$ carries a finger $n^{12}$, which in the adjustment of the arm $n^9$ moves along the scale for the purpose hereinafter described.

Mounted against the outer face of the side bar $n$ and held in place by guides are longitudinally and horizontally sliding plates $n^{13}$ $n^{14}$, (see Fig. 17,) provided with cam-recesses $n^{15}$, into which project pins $n^{16}$, which are fastened to form virtually integral portions of the arms or hangers $n^9$. The plates $n^{13}$ $n^{14}$ are connected together by a bar $n^{17}$. The forward edge of the plate $n^{13}$ has an outwardly-extending flange $n^{18}$, provided with a threaded opening to receive an adjusting-screw $n^{19}$. The screw $n^{19}$ is mounted in a guide $n^{20}$ on the bar $n$ and is held against longitudinal movement by collars $n^{21}$ on opposite sides of the guide, which do not interfere with the rotation of the screw. The outer end of the screw is squared to receive an operating-crank $n^{22}$. The pins $n^7$ are provided with collars $n^{23}$ below the guides $n^8$, and between the said collars and guides $n^{10}$ are confined stiff supporting-springs $n^{24}$. Below the guides $n^{10}$ the pins $n^7$ are threaded and provided with nuts $n^{25}$. The springs $n^{24}$ press upward against the collars $n^{23}$ and cause the nuts $n^{25}$ to bear against the under sides of the guides $n^{10}$. Great pressure exerted upon the bars $n^3$ will press them downward against the resistance of the springs $n^{24}$, whereby the upper sides $n^4$ of the bars $n^3$ form downwardly-yielding guide-surfaces for the cleats fed to the machine. The bar $n^3$ is raised and lowered equally throughout on the bar $n$ by the turning of the crank $n^{22}$. When the crank is turned in one direction, it draws the plates $n^{13}$ $n^{14}$ in the direction of the front of the machine, and thereby, bearing at their cam-recesses upon the pins $n^{16}$, raise the latter, with the arms or hangers $n^9$, to press the pins $n^7$ upward and raise the bar $n^3$. Turning of the crank in the opposite direction lowers the bar $n^3$ equally throughout by causing the cam-recesses to press down the pins $n^{16}$ and arms $n^9$. It will be understood that the construction involving the relatively stationary bar $n$, which forms the guide for one side of a cleat, and the bar $n^3$, which supports the cleat, and the mechanism for raising and lowering the bar $n^3$ on the bar $n$ to accommodate cleats of different thicknesses, is common to all the cleat-guides. In the outer cleat and sheet guides B⁵ B⁶, which extend to the rear end of the machine, the bars n³ extend only to the clenchers V, and the intermediate guides B⁷ terminate at the clenchers.

At points coincident with the upper feed-rollers r⁶ each of the bars n³ is provided with openings through its surface n⁴, and journaled in bearings in each of the bars n³, below the said openings, are short shafts n²⁶, carrying on one side lower feed-rollers or feed-wheels n²⁷, which project through the said openings in the surface n⁴ and carrying at the opposite sides sprocket-wheels n²⁸. The feed-rollers r⁶ and n²⁷ together form what I term "primary" feed-rollers, as distinguished from the secondary feed-rollers C², before described. Each rearmost shaft n²⁶ (see Fig. 29) is somewhat longer than the other shafts n²⁶ and carries a second sprocket-wheel n²⁹, which is geared, by means of a drive-chain n³⁰, to the adjacent pinion F⁴ on the drive-shaft F. The three pinions n²⁸ on each guide are geared together by a drive-chain n³¹, as most plainly shown in Fig. 16. Pressing against each drive-chain n³⁰ is a spring-actuated chain-tightener n³². Mounted in bearings on the sides of the bars n³ are guide-fingers n³³, provided at their free ends with rollers n³⁴. Each cleat-guide, as shown in Fig. 8, is provided with three guide-fingers n³³, the two forward ones being caused, by means of suitable springs housed in their bearings, to press yieldingly against the adjacent faces of the bars n, while the rear fingers n³³ are unyielding and adjustable according to the width of the cleats which travel through the machine, all for the purpose hereinafter described. The bars n of the outer cleat-guides B⁵ B⁶ are provided on their inner sides at the flanges n⁵ with longitudinal recesses n³⁵. Fitting loosely in the recesses n³⁵ are bars or strips n³⁶, forming guides for the edges of the sheet. At intervals along the strips are retaining-screws n³⁷, which pass through openings in the bars n, as shown in Fig. 20, and at the said screws are confined springs n³⁸. The screws n³⁷ slide freely through the openings in the bars n, and the springs n³⁸ tend to press the bars n³⁶ to extend flush with the inner faces of the bars n, beyond which they are prevented from projecting by engagement of the heads of the screws with the outer surfaces of the bars n. The strips n³⁶ thus form yielding guides for the lateral edges of the sheet and prevent sticking or binding of the sheet at its edges as it is fed with the cleats through the machine. The flanges n⁵ of the guide-bars B⁵ B⁶ at their inner edge portions from the forward feed-wheels n²⁷ to the rear ends of the bars overlap the edges of the sheet as the latter is fed through the machine, and the upper faces of the said flanges are cut away, as shown at n¹³, (see Figs. 8, 15, and 16,) to clear the upper feed-rollers, and also at n⁴⁴ to clear the stapling devices. In the event that the sheet is warped the overlapping flange n⁵ will hold it flat against the cleats. To facilitate the insertion of a sheet between the yielding edge-guides n³⁶, vertical guide-rollers n⁴⁵ are provided in the forward ends of the guide-bars B⁵ B⁶.

When the material, consisting of the cleats and sheet, is placed in the machine, it is necessary that the forward feed-roller r⁶ be raised and that stops be projected into the paths of the cleats for the sheet and cleats to be placed against to insure their extending evenly with each other at the ends. The forward upper feed-roller r⁶ at its opposite end portions passes through vertically-elongated openings in the plates r² r⁵ and are journaled at their ends in vertically-movable blocks m, (see Figs. 14 and 35,) housed between the brackets r r³ and the adjacent plates r² r⁵. On the blocks m are guide-pins m', which pass through vertical guide-openings in the adjacent bracket and carry cross-bars m² at their upper ends, which move in slots r¹⁵ in the upper ends of the brackets. On the under side of each block m is a downward-projecting guide-pin m³, which enters a guide-opening r¹⁶ in the side bar, and confined between the side bars and the lower edge of the block is a spring m⁴. The springs m⁴ tend to raise the blocks m and forward feed-roller r⁶. Extending longitudinally of the forward feed-roller r⁶, above the latter, is a rock-shaft m⁵, journaled at its opposite ends in the brackets r r³. Rigid upon the shaft m⁵ just beyond the bracket r³ is a short arm or crank m⁶, provided on its outer face with a pin m⁷, having a squared projecting head. Loosely mounted at one end upon the shaft m⁵ just beyond the crank m⁶ is an operating-handle m⁸, (see Figs. 9, 30, 31, and 32,) formed near its head, at which it is pivotally mounted upon the said shaft, with a lug or projection m⁹, presenting a shoulder m¹⁰. The handle m⁸ drops normally to the position shown in Fig. 30. Rigidly secured upon the shaft m⁵ where the latter at its opposite ends passes across the sockets r¹⁵ in the upper ends of the brackets r r², are lugs m¹¹. (See Figs. 14 and 35.) When the rock-shaft m⁵ is in the position indicated by the crank m⁶ in Fig. 31, the lugs m¹¹ are at an angle to the vertical plane. In the turning of the handle m⁸ from the position shown by full lines in Fig. 30 to that shown in Fig. 31 the shoulder m¹⁰ engages the pin m⁷ on the crank m⁶, whereby further upward turning of the handle to the position shown in Fig. 32 causes the shaft to be rocked in the direction which turns the lugs m¹¹ downward to extend in the vertical plane, as shown in Fig. 14. The lugs m¹¹ are formed with cam edges which slide upon the upper sides of the bars m² and press the latter downward with the pins m' and blocks m against the resistance of the springs m⁴ to press the upper forward feed-roller r⁶ downward. On the handle m⁸ is a lever m¹², pivoted at m¹³ and provided on its rear end with a link m¹⁴. Pivoted at m¹⁵ on the lug m⁹ is a lever m¹⁶, pivotally connected at one end to the end of the link $m^{14}$. At its opposite end the lever $m^{16}$ is formed with a socket, as shown in Fig. 30$^a$, to fit over the squared head of the pin $m^7$ on the crank $m^6$.

To rock the shaft $m^5$ in the direction opposite to that before described, the handle $m^8$ is raised to the position shown in Fig. 32, and pressure is exerted with the thumb upon the lever $m^{12}$ to raise the latter at its rear end with the link $m^{14}$ and turn the lever $m^{16}$ to cause it at its socketed end to engage the pin $m^7$. While the parts are thus engaged, the handle $m^8$ is pressed downward and turns the rock-shaft to turn the lugs or cams $m^{11}$ and permit the upper forward feed-roller $r^6$ to be raised by the springs $m^4$. When the pressure of the thumb upon the lever $m^{12}$ is relaxed, the latter is turned to cause the lever $m^{16}$ to disengage the pin $m^7$ by the action of a spring $m^{17}$. When the upper forward feed-roller $r^6$ is in its raised position, as indicated, for example, in Fig. 37, cleats and a sheet may be passed beneath it to the stops, which will be next described, and when the roller is clamped downward by the pressure of the lugs $m^{11}$, as shown in Fig. 14, the roller engages and clamps the sheet and cleat against the lower forward feed-wheels $n^{27}$, as indicated in Fig. 38.

Figure 5:
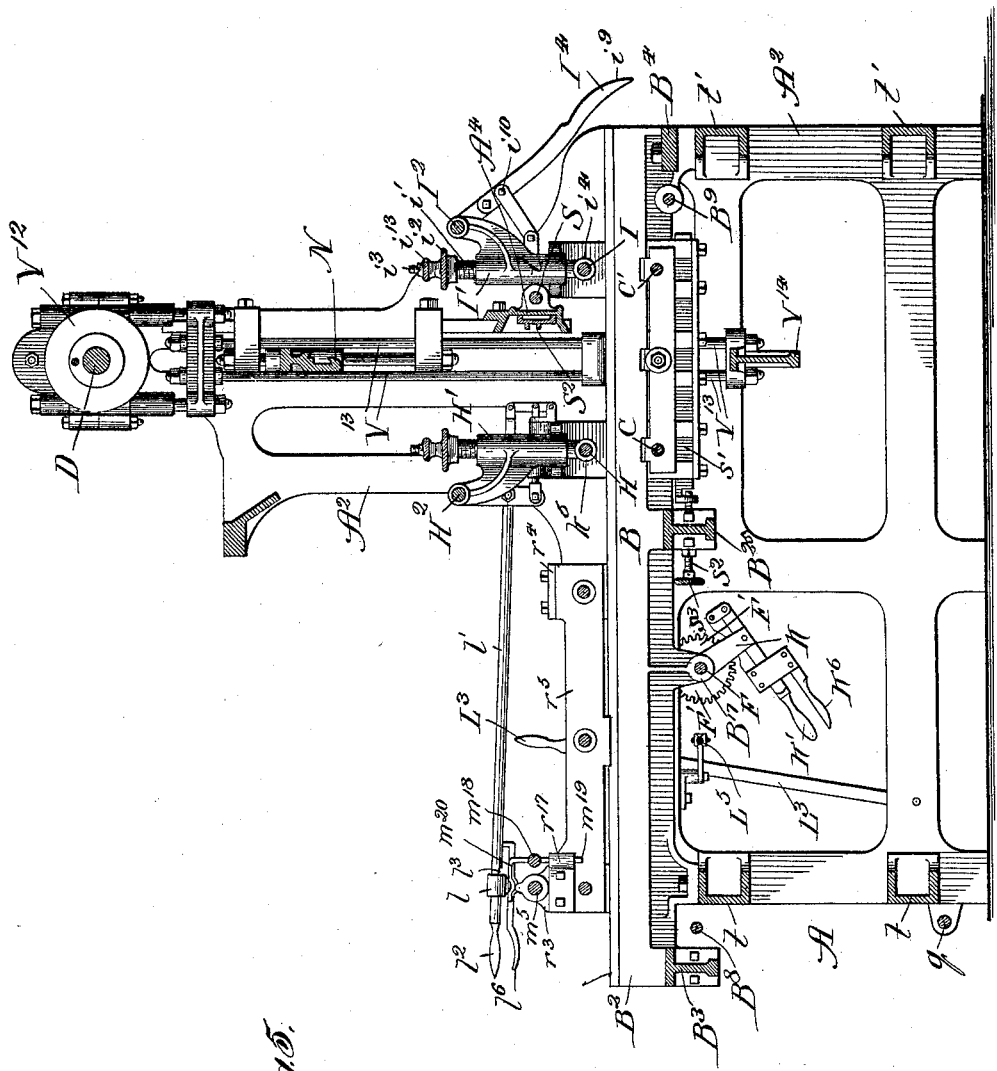

Fastened against the bars $r^2$ $r^5$ at the brackets $r$ $r^3$, as shown in Figs. 5 and 11, are brackets $r^{17}$, provided with vertical guide-openings. Adjacent to and parallel with the shaft $m^5$ is a rod $m^{18}$, provided at its opposite ends with downward-extending pins $m^{19}$, which slide in the guides $r^{17}$. Secured upon the rod $m^{18}$ at the pins $m^{19}$ are upward and laterally extending fingers $m^{20}$, bent to form on their under sides convex or cam portions $m^{21}$. The fingers $m^{20}$ extend over the rock-shaft $m^5$, and on the said shaft at the said fingers are collars carrying lugs $m^{22}$, having cam edges, as shown. On the cleat-guides B$^5$ B$^6$ (see Figs. 8, 10, and 15) are brackets $n^{39}$, having vertical guide-openings, (see Fig. 67,) and coincident therewith are openings through the overhanging portions of the bars $n$. (See Fig. 67.) On the rod $m^{18}$ are sliding collars $m^{23}$, carrying downward-extending rods or stops $m^{24}$ at each cleat-guide B$^5$ B$^6$ B$^7$. At the guides B$^5$ B$^6$ the stops $m^{24}$ pass downward through the guide-openings in the brackets $n^{39}$ and bar $n$, as shown in Fig. 67, whereby when the guides B$^5$ B$^6$ are slid laterally the stops will move with them by sliding at their collars $m^{23}$ upon the rod $m^{18}$. When the cleat-guides B$^7$ are adjusted by sliding them to the right or left, the stops $m^{24}$ adjacent thereto must be slid independently to adjust them, and when adjusted they may be secured in place upon the rod $m^{18}$ by tightening set-screws $m^{25}$ on the collars $m^{23}$. When the cleats are first fed to the machine, the stops $m^{24}$ should extend downward close to the guide-surfaces of the cleat-guides B$^5$ B$^6$ B$^7$, as shown in Fig. 37, so as to present stops against which the ends of the cleats and sheet may abut. To permit the cleats to be fed with the sheet through the machine, the stops must be raised out of the way, as shown in Figs. 36 and 38.

In the turning of the handle $m^8$ to rock the shaft $m^5$, whereby the upper forward feed-roller is raised by the action of the springs $m^4$, the cams $m^{22}$ are turned from engagement with the fingers $m^{20}$, whereby the rod $m^{18}$ and stops $m^{24}$ drop of their own weight to the position shown in Fig. 37. Thus while the upper forward feed-roller is raised the stops are down. When the handle $m^8$ is turned to rock the shaft $m^5$ to press down the upper forward feed-roller, the cams $m^{22}$ engage the fingers $m^{20}$ and raise them, the rod $m^{18}$, and stops $m^{24}$ above the path of the cleats and sheet, as shown in Figs. 36 and 38.

While the material, consisting of the cleats and sheet, is being fed across the staple-drivers, it is necessary that the feed be intermittent to advance the material in the upstroke of the staple-formers and stop the material while staples are being driven. The intermittent feed mechanism, which has been described, is geared to the drive-shaft with reference to the cross-head N, which works the staple forming and driving devices to operate in the manner stated. In operation after the rear end of the material has passed the forward upper feed-roller and is traveling through the machine cleats and a sheet must be placed by hand against the stops $m^{24}$ before they can be started through the machine. Thus if the comparatively slow intermittent feed were relied upon to advance the material initially to the staple-drivers the staple making and driving and strengthening-wire feed mechanisms would operate for a certain period of time while no material is passing across them, which would produce not only a waste of the staples and strengthening-wire, but would also produce a waste of time, all of which it is desirable to obviate. In order that this objection may not be present, I provide accelerating or double-feed mechanism, whereby when the cleats and sheet have been placed in the machine and the material being operated upon by the staple-drivers has passed the third upper feed-roller the three first upper feed-rollers and the three first lower feed-wheels may be run at a speed which will cause the material last fed to catch up with the rear end of the material fed in advance of it as the latter passes from beneath the staple-drivers. This accelerating mechanism will be next described.

As before stated, the pawl E$^{10}$ moves normally out of contact with the ratchet-wheel E$^3$, and the accelerated or double feed consists in causing the pawl E$^{10}$ to engage the ratchet-wheel, whereby the latter and the feed rollers and wheels run thereby will be turned in the positive direction with each backward rocking of the disk E, as well as with each forward rocking of the latter. The pin $m^7$, before described, passes through the crank $m^6$ on the rock-shaft $m^5$, as shown in Fig. 35, and pivotally mounted upon the said pin is a loose collar or guide $l$ for a longitudinally-movable operating-bar $l'$, formed at its end into a handle $l^2$ and provided on its under side near said handle with a notch $l^3$. Fulcrumed upon the pin $m^7$ is a lever or catch $l^4$, having a notch-engaging end $l^5$ and a handle portion $l^6$, which parallels the handle $l^2$. On the rear end of the operating-rod $l'$ and firmly secured thereto is a collar $l^7$, provided on one side with a laterally-projecting pin $l^8$. Pivotally connected to the outer end portion of the pin $l^8$ is a rod $l^9$. (See Figs. 7, 9, 34, 39, 40, and 41.) The rod $l^9$ is provided on its end portion with a block $l^{10}$, firmly attached thereto and having a downward-projecting portion which forms a guide for a rod $l^{11}$. Firmly attached to the end portion of the rod $l^{11}$ is a block $l^{12}$, having a guide-opening through it where it receives and slides upon the rod $l^9$. Surrounding the rod $l^{11}$ and confined between the blocks $l^{10}$ $l^{12}$ is a spring $l^{13}$. The construction involving the blocks $l^{10}$ $l^{12}$ and spring $l^{13}$ is merely to cause the rods $l^9$ $l^{11}$ to form practically a single yieldingly-extensible rod. Fulcrumed in the bracket $B^{16}$, Fig. 40, is a bell-crank lever $l^{14}$, pivotally connected at one end to the end of the rod $l^{11}$ and pivotally connected at its other arm with a lever $l^{15}$, fulcrumed between its ends at $l^{16}$ upon the bracket $B^{16}$. Extending vertically through the bracket $B^{16}$ are openings for pins $l^{17}$, which at their upper ends carry a cross-bar $l^{18}$, pivotally connected to the end of the lever $l^{15}$, and carrying at their lower ends, below the bracket $B^{16}$, a block $l^{19}$, having a segmental edge $l^{20}$. The pawl $E^{10}$ is pivoted at one end upon a pin $l^{21}$ on the swinging arm $E^9$, and pivoted between its ends on the pin $l^{21}$ is a block $l^{22}$, pivotally connected toward one end with the pawl and provided at its opposite end with an upwardly-projecting spring-pin $l^{23}$. The construction of the block and pin is similar to that shown in Fig. 45. Downward pressure upon the pin $l^{23}$ causes it to turn the block $l^{22}$ on the pin $l^{21}$ and through the latter to press the pawl yieldingly into engagement with the ratchet-wheel.

When it is desired to have the three forward upper feed-rollers and three forward lower feed-wheels rotate at an accelerated speed, which in practice would always be the case when the upper forward feed-roller is first lowered and the stops $m^{24}$ raised, as indicated in Fig. 38, the latch $l^4$ is caused to engage the notch $l^3$ in the bar $l'$, whereby in the raising of the handle $m^8$ and turning of the arm $m^6$, as before described, the rod $l'$ will be thrust backward to the position shown in Fig. 31. This backward movement of the rod $l'$ causes the rod $l^9$ $l^{11}$ to be drawn in the backward direction to turn the bell-crank lever $l^{14}$ and through the latter the lever $l^{15}$ to press down the bar $l^{18}$, guide-pins $l^{17}$, and segmental block $l^{19}$, causing the latter at its edge $l^{20}$ to press down upon the pin $l^{23}$ and turn the pawl $E^{10}$ into engagement with the ratchet-wheel $E^3$, whereby in the oscillation of the disk E and consequent swinging of the arm $E^9$ the pawl $E^{10}$ will turn the ratchet-wheel in the backward oscillation of the disk E, while, as before described, the pawl $E^6$ turns the ratchet-wheel in the forward oscillation of the disk E. Thus while when the pawl $E^{10}$ is disengaged from the ratchet-wheel the three upper forward feed-rollers and three sets of lower feed-wheels will turn and advance the material with each forward rocking motion only of the disk E the engagement of the pawl $E^{10}$ with the ratchet-wheel will cause the said feed-rollers and feed-wheels to be actuated and advance the material with each forward and also with each backward rocking of the disk E. When the material thus accelerated catches up with the material in advance of it, the handle $m^8$ is lowered and the arm $m^6$ swung by engagement of the lever $m^{16}$ with the pin $m^7$ in the forward direction. The rod $l'$ is thus moved forward by engagement of the catch $l^4$ with the notch $l^3$ and through the rod $l^9$ $l^{11}$ and levers $l^{14}$ $l^{15}$ raises the segmental block $l^{19}$ out of the path of the pin $l^{23}$, whereby the pawl $E^{10}$ drops out of engagement with the ratchet-wheel.

Beyond the side bar $B^2$ of the bed-frame the shafts C C' carry gear-wheels $C^3$ $C^3$, and intermediate of the gear-wheels $C^3$ $C^3$ and meshing with them is a gear-wheel $C^4$. The gear-wheel $C^4$ is upon a rotary hollow shaft or sleeve $C^5$, (see Fig. 42,) journaled upon a stationary pin $C^6$, which passes through a yoke $B^{21}$, in which the ends of the rollers C C' are journaled. On the sleeve $C^5$ is a ratchet-wheel $C^7$, beyond the outer side of the bracket $B^{15}$. Loosely surrounding the sleeve $C^5$ on the inner side of the ratchet-wheel $C^7$, and thus pivotally mounted upon the said sleeve, is a swinging arm $C^8$, (see Figs. 9, 39, 42, and 46,) carrying what I term a "primary spring-pawl" $C^9$, engaging the ratchet-wheel. At its free end the arm $C^8$ is pivotally connected to one end of a rod $C^{10}$, which at its opposite end is pivotally connected to a bolt $C^{11}$, fastened in the slot $p^6$ of the disk E. In each forward oscillation of the disk E the pawl $E^9$ engages the ratchet-wheel $C^7$ and turns it to drive the gears $C^3$ and rotate the shafts C C' and lower rear feed-wheels $C^2$, while in each backward oscillation of the disk the pawl wipes across the ratchet-wheel and the feed-wheels remain stationary. The shafts C C' are provided with longitudinal grooves $j$, Fig. 23, and the feed-wheels $C^2$ have feathers $j'$, Fig. 24, which enter said grooves. On the outer cleat-guides $B^5$ $B^6$ (see Figs. 15, 16, and 24) are bifurcated projections or lugs $B^{23}$, fitting over the shafts C C' and carrying yokes or collars $B^{24}$, having inner circumferential tongues which fit loosely into annular grooves $j^2$ in the hubs of the wheels $C^2$, Figs. 23 and 24. In the lateral adjustment of the guides $B^5$ $B^6$, before described, the wheels $C^2$ are moved longitudinally of the shafts C C', but being feathered upon the shafts they rotate with the latter.

Just above and parallel with the lower feed-wheels $C^2$ are upper feed-rollers H I. (See Fig. 7.) Secured upon the side frames $B' B^2$ are upward-extending brackets $H'$ on opposite sides of the machine, in the positions indicated in Figs. 7 and 8, the brackets having vertical sleeve portions $h$. Also secured to the side bars $B^2$, in the positions indicated, are brackets $I' I'$, having upward-extending sleeve portions $i$. (See Figs. 3, 4, 5, 6, 23, and 27.) The sleeves $i$ are threaded at their upper inner end portions to receive inner adjusting-sleeves $i'$, provided at their upper ends with hand-wheel portions $i^2$. Extending through the sleeves $i^2$ are adjusting-rods $i^3$, which at their lower ends carry heads or blocks $i^4 i^4$, in which the opposite ends of the roller I are journaled. Confined in the sleeves $i$, between the lower ends of the sleeves $i'$ and the heads or blocks $i^4$, are stiff springs $i^5$. On the sleeves $i$ are arms $i^6$, (see Figs. 3, 4, and 27,) in the upper ends of which is journaled a rock-shaft $I^2$, Fig. 7, provided at its end adjacent to the cheek $A^2$ with a short crank-arm $i^7$. Pivotally secured at their lower ends to the roller I, at the journals of the latter, are upward-extending arms $I^3$, Fig. 23, pivotally connected at their upper ends with arms $i^8$, which are rigidly secured to the rock-shaft $I^2$. Pivotally connected with the free end of the crank-arm $i^7$ is a lever $I^4$, having a handle portion $i^9$. The lever $I^4$ is fulcrumed at $i^{10}$ upon the end of a link $i^{11}$, which at its opposite end is pivoted to a lug $i^{12}$ on the adjacent bracket $I'$. The rods $i^3$ are threaded at their upper ends and there provided with nuts $i^{13}$. The normal relative position of the roller I with relation to the feed-wheels $C^2$ on the shaft $C'$ may be regulated by adjusting the inner sleeves $i'$ in the outer sleeves $i$ and by adjusting the nuts $i^{13}$ on the rods $i^3$. The springs $i^5$ press the roller I at its opposite ends in the downward direction to a distance limited by the engagement of the nuts $i^{13}$ with the tops of the inner sleeves $i^2$. In practice the roller I bears yieldingly downward upon the sheet of material as the latter leaves the machine, and when it is desired to lift the roller I against the resistance of the springs $i^5$ this may be done by drawing upward upon the handle $i^9$ of the lever $I^4$, which by rocking on its fulcrum $i^{10}$ turns the rock-shaft $I^2$ by means of the crank-arm $i^7$ and turns the arms $i^8$ to draw the rods $I^3$ upward and raise the roller I equally at opposite ends. When the lever $I^4$ is released, the roller will be returned to normal position by the springs $i^5$.

In the sleeves $k$ (see Figs. 30 to 34) of the brackets $H'$ are inner sleeves $k'$, corresponding in construction with the sleeves $i'$ described, and the said sleeves are provided with hand-wheels $k^2$. (See Fig. 7.) Extending downward through the sleeves $k'$ are rods $k^3$, provided at their upper ends with adjusting-nuts $k^4$ and at their lower ends carrying heads or blocks $k^5$, in which the roller II is journaled at its opposite ends. Confined between the lower ends of the inner sleeves $k'$ and the journal-blocks $k^5$ are springs corresponding with the springs $i^5$ described and which press the roller in the downward direction. The normal position of the roller II with reference to the feed-wheels $C^2$ on the shaft $C$ is regulated by adjusting the sleeves $k'$ in the sleeves $k$ and adjusting the nuts $k^4$ on the rods $k^3$. On the sleeves $k$ are arms $k^6$, in the upper ends of which is journaled a horizontal rock-shaft $H^2$. Rigidly secured at one end to the end of the rock-shaft $H^2$, adjacent to the cheek $A^2$, is a crank-arm $k^7$, pivotally connected between its ends to a collar $k^8$, which slides loosely upon the operating-rod $l'$. On the end of the operating-rod $l'$ and pivoted at one end to the collar $l'$ thereon is a link $k^9$, which at its free end pivotally connects with a lever $k^{10}$, fulcrumed at its lower end to a lug $k^{11}$ on a cylindrical plug $k^{13}$, movable in a cylindrical recess in the bracket $H'$. Extending through a guide-opening in the said plug and bracket $H'$ is a rod $k^{12}$, at one end pivotally connected to the lever $k^{10}$, between the ends of the latter, and at its opposite end pivotally connected with the lower end of the crank-arm $k^7$. On the rock-shaft $H^2$, near its opposite ends, are crank-arms $H^3$, and pivotally connected at their upper ends to the crank-arms $H^3$ and at their lower ends loosely engaging the journals of the roller II are bars $H^4$. In operation when the cleats and a sheet are initially fed to the staple-forming driving-machines and the upper forward feed-rollers are caused to rotate at accelerated speed, as described, it is also necessary that the roller II be raised slightly, as indicated in Fig. 38, so that the material may pass readily beneath it to the staple-drivers. Thus the turning of the lever or handle $m^8$ to thrust the rod $l'$ in the backward direction and accelerate the forward feed-rollers and feed-wheels, as described, also raises the roller II by causing the rod $l'$ to thrust the link $k^9$ in the backward direction to turn the lever $k^{10}$, draw the pin $k^{12}$, and swing the crank-arm $k^7$ to rock the shaft $H^2$, whereby the crank-arms $H^3$ lift the bars $H^4$ and raise the roller II against the resistance of its spring. As soon as the material has reached the roller II the handle $m^8$ is swung downward by the operator to cause the feed-rollers $r^6$ and feed-wheels $m^{27}$ to turn intermittingly at normal speed, as before described, the lowering of the handle also causing the rod $l'$ to be drawn in the forward direction and move the parts $k^9 k^{10} k^{12} k^7$ and rock-shaft $H^2$ in the direction opposite to that described, whereby the roller II is pressed downward by its springs to clamp the material against the feed-wheels $C^2$ on the shaft C.

Journaled on a shaft $k^{14}$, (see Fig. 41,) mounted in a stationary plate on the machine, hereinafter described, is a rocking disk $k^{15}$, (see Fig. 52,) to which is eccentrically pivoted a link $k^{16}$, which at its opposite end is pivoted to the pin $l^8$ on the rod $l'$. When the rod $l'$ is drawn forward the link $k^{16}$ turns the disk $k^{15}$ almost to a dead-center, as shown in Fig. 52, whereby the rod is held in its forward position with a desired degree of rigidity. When the rod $l'$ is thrust backward to raise the roller H, it causes the link $k^{16}$ to turn the disk $k^{15}$ nearly to the opposite dead-center, whereby the rod will be held in its backward position with sufficient force to overcome pressure of the incased springs, which tend to force down the roller H, though not with sufficient force to prevent the rod $l'$ from being drawn forward by means of the lever $m^8$. In case that the roller H is raised against the resistance of the incased springs, which press it down, as when a shaving or splinter is upon the material, the rock-shaft H$^2$ will be turned and force the pin $k^{12}$ in the backward direction to swing the lever $k^{10}$. As the rod $l'$, being held by the link $k^{16}$, as described, will not readily yield, it will act as the fulcrum of the lever $k^{10}$ and the plug $k^{13}$ will be moved, as shown in Fig. 33. This construction prevents interference with the upward yielding of the roller H, which is necessary to prevent the material from becoming clogged at that point.

In the present machine a certain amount of judgment is required on the part of the operator to cause the material when fed to be moved with accelerated speed and catch up with the rear end of the material that is ahead of it by the time the latter passes from beneath the staple-drivers, and it sometimes happens that when the strengthening-wires are cut and the machine is stopped, all as hereinafter explained, the material last fed will not have quite reached the staple-drivers. To advance the material to the staple-drivers while the machine is at rest, I provide upon the shaft F, at opposite sides of the pinion F', hangers or arms K, (see Figs. 5, 9, 39, 40, and 41,) which are pivoted upon the shaft to swing freely and between the lower ends of which is fulcrumed between its ends a lever K'. On the rear end of the lever K' is a pivotal link K$^2$, to which is pivoted a bar K$^3$, provided between its ends with teeth K$^4$, (see Fig. 41,) adapted to mesh with the teeth of the pinion F'. On opposite sides of the forward end of the bar K$^3$ are downward-extending plates K$^5$, which extend on opposite sides of the handle K' and beneath the said handle carry a handle K$^6$, extending parallel with the handle K'. The parts are normally in the position shown, for example, in Figs. 39, 40, and 41, and when it is desired to turn the pinion F' and shaft F to rotate the upper forward feed-rollers and lower forward feed-wheels the handles K' K$^6$ are grasped to raise the bar K$^3$ and cause its teeth K$^4$ to engage the pinion F', after which the handles are drawn in the forward direction to swing with the hangers K and turn the pinion. The handle K$^6$ is then released to disengage the teeth of the pinion and the parts swung backward, when the operation may be repeated until the material has been moved the desired distance into the machine.

For the purpose more especially of advancing the material into the machine before the latter is initially started I provide the following speed-gear mechanism: Loosely journaled upon the shaft F is a belt-pulley L, Figs. 1, 6, 7, and 69, connected by a belt L' with the constantly-rotating drive-pulley D'. The hub of the pulley L is serrated at its inner edge to form a clutch member. Feathered upon the shaft F, adjacent to the pulley L, is a sliding collar L$^2$, also serrated to form a clutch member. On the outer side of the cheek A$^2$ and fulcrumed at its lower end thereon is a swinging lever L$^3$, (see Fig. 9,) pivotally connected between its ends with a bell-crank lever L$^4$, fulcrumed on the main frame. The other arm of the bell-crank lever is pivotally connected with a thrust-rod L$^5$, which extends parallel with the shaft F across the machine and is pivoted at its opposite end to one end of a lever L$^6$, which at its opposite end is forked to loosely embrace the sliding collar L$^2$ at a groove in the latter. The lever L$^6$ is fulcrumed between its ends upon a bracket L$^7$, (see Fig. 8,) secured to the cheek A'. When it is desired to rotate the upper forward feed-rollers and lower forward feed-wheels at comparatively high speed before the machine is started or while it is at rest, the lever L$^3$ is turned to turn the bell-crank lever L$^4$ and move the rod L$^5$ to swing the lever L$^6$ and move the clutch members into engagement with each other. The pulley L is rotated constantly by the constantly-rotating pulley D', so that the said feed rollers and wheels may be actuated at any time and then released by the turning of the handle L$^3$.

While the material is being fed across the staple-drivers it is necessary that at certain points or transverse lines, (designated by $x$ in Fig. 70,) where, as before stated, the step-mitering machine is to cut away material to permit bending of the blank to form the box, no staples should be driven, for the reason that they would interfere with the operation of the step-mitering machine and also with the bending of the blank. The means employed in the present machine for preventing the driving of staples at those points consist in mechanism which moves the material at increased speed and therefore a greater distance across the staple-drivers in the up-strokes of the latter when the points $x$ are approached, whereby the said points are skipped in the sense that no staples will be driven there. The mechanism which accomplishes this result will be next described, and following this description will be an explanation of mechanism closely coöperating therewith to sever the strengthening-wires and then stop the machine.

On the vertically-reciprocating bar or cross-head N, which is operated by eccentrics N' on the drive-shaft D to actuate all the staple-drivers T, is a vertical bar or carrier M, (see Figs. 9, 39, 40, 41, and 46,) which reciprocates in a guide formed by a vertical slot A$^3$ in the cheek $A^2$ of the machine. On the carrier is a plate $M'$, having its upper and lower ends shaped, respectively, to afford cams $h$ $h'$, as shown most distinctly in Fig. 50. Above the cam-plate $M'$ and firmly secured to the carrier M is an outwardly and downwardly projecting finger $M^2$. Near the upper end of the cam-plate $M'$ and carried thereby is a stop $M^3$. The stop $M^3$ consists of a rock-shaft or pin $h^2$, journaled in a bearing-plate or bracket $h^3$, fastened to the plate $M'$ and carrying at one side of said bearing, at a point midway between the sides of the plate, a head $h^4$, (see Fig. 46,) provided with the three stop projections $h^5$ $h^6$ $h^7$. The stop projection $h^6$ rests against a spring-stud $h^8$, which tends to press the stop $h^6$ in the outer direction, and the stop $h^7$ against the face of the plate $M'$. Upward pressure against the stop $h^5$ would tend to turn the head $h^4$ on its axis against the resistance of the spring-stud $h^8$. The spring of the spring-stud is made very stiff, so that while in the operation the impact of the stop $h^5$ against the parts hereinafter described will not turn the head $h^4$ the spring-stud $h^8$ renders the head yielding to a slight degree in case that, through want of perfect adjustment, the plunge of the carrier M, as hereinafter described, should be excessive. Also upon the cam-plate $M'$, in the position shown, is a rigid forward-projecting pin $h^9$, (see Figs. 50 and 51,) and directly below the said pin is a laterally-swinging finger $h^{10}$, pivoted at $h^{11}$ and having an outwardly-projecting toe $h^{12}$. At the side of the pin $h^9$ and rigid upon the plate $M'$ is a wedge-shaped cam-block $h^{13}$. (Shown most distinctly in Fig. 51.)

Bolted upon the cheek $A^2$ in the position shown is a plate P, provided on its rear face with spacing projections or lugs $P'$. (See Figs. 46 and 52.) The plate P has the plain upper portion $P^2$ and lower portion $P^3$, which is L-shaped in vertical cross-section, as indicated for example, in Figs. 56, 58, and 59. Journaled in a bearing $P^4$, which is adjustably secured to the part $P^3$ of the plate P, is a short shaft $P^5$, (see Figs. 46 and 64,) provided at one end, on the inner side of the bearing, with a pinion $P^6$, which meshes with the gear-wheel $C^4$, and provided at its opposite end, at the forward face of the part $P^3$, with a pinion $P^7$.

Fastened against the forward face of the part $P^3$ of the plate P is a hollow case or housing Q, consisting of a back plate $Q'$ and front plate $Q^2$. (See Figs. 46 and 47.) The front plate $Q^2$ is provided on its rear face with a marginal flange $Q^3$, against which the back plate is secured to afford a chamber $Q^4$. On the front face of the plate $Q^2$ is a recess $Q^5$, bounded by an annular flange $Q^6$, which is provided with a groove $Q^7$, T-shaped in cross-section, as shown, for example, in Figs. 46 and 47. Journaled upon a pin or screw $g$ in the lower part of the housing Q is a pinion $g'$, (see Figs. 48 and 49,) which meshes with the pinion $P^7$, to be driven thereby, as shown in Fig. 46. Extending through the housing, at the center of the circle described by the segmental portion thereof, is a pin or shaft $g^2$, surrounded by a sleeve $g^3$, in turn surrounded by a sleeve $g^4$, which latter forms a bearing for the hub $g^5$ of a large gear-wheel $g^6$ in the chamber $Q^4$. The chamber $Q^4$ is open at its lower end, and at the said opening the gear-wheel $g^6$ meshes with the gear-wheel $g'$. (See Figs. 46 and 49.) The pin $g^2$ slides longitudinally in the sleeve $g^3$ and is provided on its inner end with a grooved collar $g^7$. The sleeve $g^3$ in turn slides longitudinally on the pin $g^2$ and in the sleeve $g^4$ and at its inner end carries a grooved collar $g^8$. The sleeve $g^4$ slides loosely in the hub $g^5$ of the wheel $g^6$ and is provided on its inner end with a cup-shaped friction clutch member $g^9$. The hub $g^5$ of the wheel $g^6$ is shaped to form at its inner face a clutch member to be engaged by the clutch member $g^9$ in the sliding of the sleeve $g^4$, as hereinafter described. Firmly secured upon the sleeve $g^4$, as shown in Figs. 65 and 66, is an arm $Q^8$. Fastened against the lower part of the plate $Q^2$ is a U-shaped bracket $Q^9$, (see Figs. 39 and 46,) carrying a disk $Q^{10}$, forming a housing for the arm $Q^8$. Secured at one end to the hub portion of the arm $Q^8$ and at its opposite end to a stud $g^{10}$ on the disk $Q^{10}$ is a coiled spring $g^{11}$, which tends normally to cause the arm $Q^8$ to bear against a stop $g^{12}$ on the plate $Q^2$. At intervals around the disk $Q^{10}$ are adjustable studs or posts $Q^{11}$, $Q^{12}$, $Q^{13}$, and $Q^{14}$, comprising cylinder portions $g^{13}$, having laterally-projecting arms $g^{14}$. Extending through the cylinder portions $g^{13}$ are pins $g^{15}$, at their inner ends formed with T-heads $g^{16}$ to fit the T-groove $Q^7$ and threaded at their outer ends to receive thumb-nuts $g^{17}$. The arms $g^{14}$ extend parallel with and adjacent to the inner surface of the disk $Q^{10}$, and on the cylinder portions are pointers $g^{18}$, which extend over the edge portion of the disk $Q^{10}$. By loosening the thumb-nuts $g^{17}$ the studs or posts may be slid around the T-groove $Q^7$ to any desired position and may then be fastened firmly in place in such position by tightening the thumb-nuts $g^{17}$. Around the circumferential edge portion of the disk $Q^{10}$ is a scale, as indicated, for example, in Fig. 39, all for a purpose hereinafter described.

Pivotally mounted between its ends on the arm $Q^8$ is a tripping-finger $g^{19}$, provided at its outer end with a forward-projecting lug or toe $g^{20}$, (see Fig. 65,) and at its inner end portion the said finger passes loosely through recesses in the hub of the arm $Q^8$ and in the sleeves $g^4$ $g^3$ into pivotal engagement with the pin $g^2$, the pin $g^2$ being provided with a short slot $g^{21}$ (see Figs. 46 and 47) to receive the end of the finger, which latter is rounded, as indicated in Fig. 46. Parallel with the finger $g^{19}$ and somewhat shorter than the latter is a tripping-finger $g^{22}$, also pivoted between its ends on the arm $Q^8$ and passing through recesses in the hub of the arm $Q^8$ and in the sleeve $g^4$ into pivotal engagement with the sleeve $g^3$. At its outer end the finger $g^{22}$ carries a forward-projecting lug or toe $g^{23}$.

On the rear side of the plate Q' (see Figs. 47 and 48) are bearing-lugs $f f$, between which is pivoted a swinging arm $f'$. Also fastened upon the rear face of the plate Q are guide projections $f^2 f^2$ for the opposite sides of the arm $f'$. The free end portion of the arm $f'$ is bifurcated and provided in its ends with antifriction-rollers $f^3 f^3$, which ride upon the rear face of the sliding friction clutch member $g^9$. On the side of the arm $f'$ is a projection forming a cam-block $f^4$. Confined between the clutch members $g^5 g^9$ is a spring $g^{24}$, which tends normally to press the said clutch members out of engagement. Fulcrumed at $f^5$ on the front side of the plate P (see Fig. 41) is a lever $f^6$, which has a long arm extending past the side of the housing Q. Pivotally mounted upon the end of the short arm of the lever $f^6$ to swing laterally thereon is a downward-extending finger $f^7$, the lower portion of which forms a cam $f^8$. (See Fig. 58.) Above the short arm of the lever $f^6$ on the plate P is a stop $f^9$, which limits the rise of the short arm of the lever. At the side of the finger $f^7$ opposite the cam $f^8$ is a yielding stop $f^{10}$, (see Fig. 47,) which is held in normal position by a stiff spring $f^{11}$, confined between the shoulder on the stop or pin $f^{10}$ and the inner end of a screw cup or thimble $f^{12}$, fastened in the plate P.

When the short arm of the lever $f^6$ is in the raised position shown, for example, in Fig. 41, the upper end of the finger $f^7$ is in the path of the finger $M^2$ on the vertically-reciprocating carrier M. When the machine is started, the first downward plunge of the carrier causes the finger $M^2$ to strike the upper end of the finger $f^7$ and drive the latter downward, so that the cam $f^8$ slides between the spring-stop $f^{10}$ on the one side and the cam-block $f^4$ on the opposite side, whereby the arm $f'$ is swung to press the clutch member $g^9$ into engagement with the clutch member $g^5$ and cause the sleeve $g^4$ to revolve with the wheel $g^6$ and swing the arm $Q^8$. It will be remembered that the wheel $g^6$ meshes with the pinion $g'$, which in turn is engaged by the pinion $P^7$ on the shaft $P^5$, which latter carries the pinion $P^6$, meshing with the gear-wheel $C^4$ on the sleeve $C^5$, carrying the ratchet-wheel $C^7$. Thus the intermittent movement of the ratchet-wheel $C^7$ is conveyed to the wheel $g^6$ and through the latter when its hub or clutch member is engaged by the clutch member $g^9$ to the sleeve $g^4$, carrying the arm $Q^8$, causing the latter to be turned intermittingly against the resistance of the spring $g^{11}$.

The posts $Q^{11} Q^{12} Q^{13} Q^{14}$ in practice are adjusted with reference to the scale on the disk, so that the arm $Q^8$ will pass the post $Q^{11}$ when the first skip is to be made, the post $Q^{12}$ when the second skip is to be made, the post $Q^{13}$ when the third skip is to be made, and the post $Q^{14}$ when the cut-off mechanism is to be actuated and the machine stopped. On each of the fingers $g^{14}$, carried by the posts $Q^{11}$, $Q^{12}$, $Q^{13}$, and $Q^{14}$, is a cam $g^{25}$, the said cams on the fingers of the posts $Q^{11}$, $Q^{12}$, and $Q^{13}$ being in the path of the lug or toe $g^{20}$ on the finger $g^{19}$ and the cam $g^{25}$ on the post $Q^{14}$ being in the path of the lug $g^{23}$ on the finger $g^{22}$. In the rotation of the arm $Q^8$ the lug or toe $g^{20}$ wipes across the cams $g^{25}$—first that on the post $Q^{11}$, then that on the post $Q^{12}$, and then that on the post $Q^{13}$—and as it engages a cam the finger $g^{19}$ is swung on its pivot to move the pin $g^2$ longitudinally outward or to the left in Fig. 46.

On the rear face of the plate Q' is a stud or bracket $f^{13}$, Figs. 46 and 48, and pivoted between their ends upon the stud $f^{13}$ are swinging fingers $f^{14} f^{15}$, which at their lower ends are bifurcated to engage, respectively, the collar $g^7$ on the pin $g^2$ and the collar $g^8$ on the sleeve $g^3$. The inner face of the part $P^2$ of the plate P is recessed in its upper end portion to receive, retain, and guide a vertically-sliding plate $f^{16}$. (Shown in detail in Fig. 53, and see Figs. 46, 52, and 55.) In the said plate are a longitudinal opening $f^{17}$, an inclined slot or cam-opening $f^{18}$, and an opening for a push-pin $f^{19}$. Below the pin $f^{19}$ on the plate $f^{16}$ is a cam-block $f^{20}$, provided with a shoulder $f^{21}$, forming a stop or catch. Fastened against the part $P^2$ of the plate P is a leaf-spring $f^{22}$, (see Figs. 46 and 52,) provided on one side with a cam projection $f^{23}$, having a shoulder $f^{24}$. The cam projection $f^{23}$ is in the path of the cam $f^{20}$ on the plate $f^{16}$, and the shoulder $f^{24}$ on the spring $f^{22}$ is adapted to engage the shoulder $f^{21}$ on the plate $f^{16}$. (See Fig. 46.) Pivoted at $f^{25}$ (see Fig. 52) on the rear face of the part $P^2$ of the plate P is a lever $f^{26}$, at its upper end carrying a laterally-extending antifriction-roller $f^{27}$, (see Fig. 54,) which extends into the cam-opening $f^{18}$ on the plate $f^{16}$. Between the pivot $f^{25}$ and the lower end of the lever $f^{26}$ and upon the latter is pivotally connected a pin $f^{28}$, which passes through a guide-opening in the adjacent spacing-lug P'. (See Fig. 52.) Surrounding the pin $f^{28}$ and confined between the said spacing-lug and a cross pin or shoulder on the pin $f^{28}$ is a stiff spring $f^{29}$, which tends normally to swing the lower arm of the lever $f^{26}$ in the direction to the left in Fig. 52. Journaled in the part $P^3$ of the plate P (see Figs. 46, 52, and 58) is a short shaft $f^{30}$, carrying on one side of the plate a crank $f^{31}$ and at its opposite end a crank $f^{32}$. Pivotally connected with the lower end of the lever $f^{26}$ is a link $f^{33}$, which at its opposite end is pivotally connected with the crank $f^{32}$.

On the outer side of the bracket $B^{15}$ (see Fig. 40) is a box $B^{22}$, which forms an outer bearing for the pin or shaft $C^6$ and is provided at opposite sides of said pin or shaft with vertical guide-openings (see Fig. 45) for pins $f^{34}$, which above said box carry a cross-bar $f^{35}$, pivotally connected with the free end of the crank $f^{31}$. Below the box $B^{22}$ the pins $f^{34}$ carry a segmental plate $f^{36}$. Pivotally connected to the crank $p^2$ on the end of the drive-shaft D is a plunger-rod $f^{37}$, (see Figs. 6 and 9,) which at its lower end is pivotally and adjustably connected with a bell-crank lever $f^{38}$, fulcrumed upon the sleeve $C^5$. On the opposite end of the bell-crank lever $f^{38}$ is a laterally-projecting pin $f^{39}$, (see Figs. 43 and 44,) upon which is pivotally mounted what I term a "secondary pawl" $f^{40}$. Pivotally mounted on the end of the pin $f^{39}$ is a lever $f^{41}$, at one end connected through the medium of a pin $f^{42}$ with the dog or pawl $f^{40}$ and on the opposite side of its pivot carrying a spring stop projection $f^{43}$, which is directly below the segmental edge of the plate $f^{36}$, as shown also in Fig. 40. In the rotation of the drive-shaft D the rod $f^{37}$ is plunged up and down to swing the bell-crank lever and pawl along the ratchet edge of the wheel $C^7$; but the pawl is normally out of engagement with the ratchet-wheel, as shown in Figs. 9 and 43.

When the arm $Q^8$ in its rotation reaches the first post $Q^{11}$, the finger $f^{19}$ at its lug $g^{20}$ wipes across the respective cam $g^{25}$ carried by the said post, and in doing so the finger $f^{19}$ is swung on its pivot in the direction of moving the pin $g^2$ in the outward direction, which is the direction to the left in Fig. 46, whereby the lever $f^{14}$ is caused to move the pin $f^{19}$ against the resistance of the spring $f^{22}$ and swing the latter at its stop $f^{24}$ out of engagement with the shoulder $f^{24}$ on the plate $f^{16}$. The plate $f^{16}$ being thus released is raised in its guide by the pressure of the lever $f^{26}$, Fig. 52, in the cam-opening $f^{18}$, the said pressure being due to the spring $f^{29}$. This turning of the lever $f^{26}$ draws upon the link $f^{33}$ and swings the crank $f^{32}$ and rocks the rock-shaft $f^{30}$ to swing down the crank $f^{31}$ (see Fig. 40) and depress the segmental plate $f^{36}$, whereby it presses downward upon the spring-pin $f^{43}$ and swings the pawl $f^{40}$ into engagement with the ratchet-wheel $C^7$. The ratchet-wheel, as before stated, is moved with each reciprocation of the disk E, and the engagement of the pawl $f^{40}$ with the ratchet-wheel $C^7$ turns the latter while the disk E is rocking in the direction which causes the pawl $C^9$ to slide over the ratchet-wheel $C^7$. The plunger-bar $f^{37}$ at its lower end is adjustably secured in a longitudinal slot in the bell-crank lever $f^{38}$, as shown, for example, in Fig. 9, so that the distance of turning of the ratchet-wheel with each operation may be regulated. It will be remembered that the turning of the ratchet-wheel $C^7$ rotates the lower rear feed-wheels $C^2$, so that each time the ratchet-wheel is actuated by engagement with it of the pawl $f^{40}$ the material will be fed at increased speed across the staple-drivers T.

On the outer side of the part $P^2$ of the plate P are guides $e$ $e'$, Figs. 41 and 56, for a vertically-disposed and longitudinally-sliding bar R. On the bar, directly above the guide $e$, is a pin or screw $e^2$, carrying a roller $e^3$. (See Fig. 54.) At the top of the bar R in the position shown is an outwardly-projecting pin $e^4$. Passing through and journaled in the part $P^2$ of the plate P is a rock-shaft $R'$, which also passes through an elongated slot in the bar R and the elongated slot $f^{17}$ in the plate $f^{16}$, Figs. 53 and 54, whereby the shaft will not interfere with the sliding of either said bar or plate. The rock-shaft $R'$ at its outer end carries a cam $e^5$, and at its opposite end it carries a crank-arm $e^6$. (See Figs. 56 and 57.) The shaft $R'$ is somewhat longer than the parts through which it passes and in which it has its bearings and is capable of sliding longitudinally in its bearings. As shown in Figs. 51 and 54, the rock-shaft $R'$ is in its normal or outward position, and when moved longitudinally in the inner direction the crank $e^6$ thereon is moved into the path of the toe $h^{12}$, carried by the finger $h^{10}$, which, as before explained, is pivotally mounted upon the reciprocating cam-plate M'. The cam $e^5$ is normally in contact with the roller $e^3$ on the bar R, and adjacent to the outer face of the cam is the end of the finger $f^{15}$, before described. Extending through an opening in the top of the part $P^2$ of the plate P is a pin $e^7$, (see Fig. 54,) and pressing downward upon the pin is a finger-spring $e^8$, (see Fig. 52,) which causes the pin to press yieldingly upon the rock-shaft $R'$, and thus produce a frictional resistance against the turning and sliding of the latter. On the upper face of the horizontal portion of the part $P'$ of the plate P are bearing-lugs $e^9$ $e^9$ (see Figs. 41, 56, 58, and 59) for a horizontal rock-shaft $R^2$. On one end of the rock-shaft, beyond one of the bearing-lugs $e^9$, is a crank-arm $e^{10}$, (see Fig. 56,) which enters a socket in the lower end portion of the bar R and is there in pivotal contact or connection with the said bar. Fastened upon the rock-shaft $R^2$, between its bearings, is a yoke $R^3$, provided in its ends with inwardly-projecting pins $e^{11}$. In the part $P^2$ of the plate P is an opening $P^8$ of the shape shown, for example, in Figs. 41 and 52. Extending across the lower part of the opening on the forward side of the plate and rigidly secured to the latter is a cross-plate $P^9$. The cross-plate midway between its ends is provided with a bearing-opening for a longitudinally-movable rock-shaft $R^4$. On the outer end of the shaft $R^4$ is a collar $e^{12}$, (see Fig. 41,) provided with a peripheral groove $e^{13}$, (see Figs. 58 and 59,) into which the pins $e^{11}$ on the yoke $R^3$ project. Surrounding the rock-shaft $R^4$ and confined in a socket in the plate $P^9$, to bear at opposite ends, respectively, against the said plate and the collar $e^{12}$, is a spring $e^{14}$, which tends normally to press the shaft $R^4$ in the outer direction to the position shown in Fig. 58. Loosely mounted upon the shaft $R^4$ in the opening $P^8$ is an arm $R^5$, (see Fig. 59,) and fixed upon the inner end of the shaft $R^4$ is an arm $R^6$. (See Fig. 52.) Screwed into the free end portion of the arm $R^5$ is a hollow stud $e^{15}$, presenting an annular socket or bearing-surface $e^{16}$ (see Fig. 58) and an outer flange $e^{17}$. Extending through the hollow stud $e^{15}$ is a pin $e^{18}$, which is fixed to the arm $R^6$ and slides loosely in the opening through the stud. Thus in the rocking of the shaft $R^4$, as hereinafter described, the arm $R^6$ will be rocked with the shaft, and owing to its pin connection $e^{18}$ with the arm $R^5$ the latter will also be rocked, and when the shaft $R^4$ is slid longitudinally inward it slides the arm $R^6$ in the same direction, the pin $e^{18}$ holding the arms when thus separated so that they will rock together. The end of the pin $e^{18}$ beyond the arm $R^5$ forms a bearing for a wheel $e^{19}$, which is confined upon the pin, as shown in Fig. 58. Pivotally mounted at one end upon the bearing-surface $e^{16}$ of the lug $e^{15}$ (see Fig. 58) is a link $R^7$, provided, in the position shown, with an outwardly-projecting pin $e^{20}$, (see Figs. 41 and 60,) which projects across one lateral edge of the downward-extending cam-finger $f^7$, before described.

S is a rock-shaft which extends across the machine parallel with the stationary beam $A^4$, upon which the staple forming and driving machines are secured. A detail view of the rock-shaft S is shown in Fig. 68. On the end of the shaft S is a crank S', which at its free end is pivotally connected to the link $R^7$ by means of a pin $e^{21}$. (See Fig. 41.) Pivoted upon a pin extending from the inner side of the part $P^2$ of the plate P is a bearing-lug $P^{10}$, (see Fig. 52,) and fulcrumed between its ends upon the said bearing-lug is a swinging lever $R^8$ of the shape shown, for example, in Figs. 41 and 52. At its upper end the lever $R^8$ carries an antifriction-roller $e^{22}$, and at its lower end it is pivotally connected to the before-mentioned pin $e^{21}$ on the end of the link $R^7$. Housed in the beam $A^4$ is the horizontally-extending and vertically-sliding bar $S^2$, (see Figs. 61 and 62,) which operates the strengthening-wire-severing mechanism of the staple forming and driving machines, as hereinafter more particularly described. Toward opposite ends the shaft S is provided with fingers $S^3$, (shown in Figs. 62 and 68,) the ends of which are formed into balls and enter sockets in the bar $S^2$. The shaft S is journaled in bearings $S^4$ on the beam $A^4$, and at its end opposite the crank S' it carries a crank $S^5$. (See Figs. 68, 1, 2, 6, and 7.) On the rod $q^4$, Fig. 2, which moves the sliding clutch member on the shaft D, is a laterally-projecting bearing $q^8$, having a downwardly-projecting spring-pin $q^9$, which is just above the path of the crank $S^5$ of the rock-shaft S.

In operation, when the arm $Q^8$ is moved around to the position where the toe $g^{23}$ on the finger $g^{22}$ engages the cam $g^{25}$ on the post $Q^{14}$, the finger $g^{22}$ is swung upon its pivot by said engagement to move the sleeve $g^3$ in the outward direction and swing the finger $f^{15}$ against the outer face of the cam $e^5$ and push the shaft R' in the inward direction, whereby the crank-arm $e^6$ extends in the path of the toe $h^{12}$ of the swinging finger $h^{10}$, which, as before explained, reciprocates with the carrier M. In the next upward plunge of the carrier M the toe $h^{12}$ engages the under side of the crank-arm $e^6$ and turns it to rock the shaft R' and turn the cam $e^5$, whereby the latter presses down the antifriction-roller $e^3$ and moves the bar R longitudinally downward. This movement of the bar R, owing to its connection with the crank $e^{10}$ on the rock-shaft $R^2$, rocks the latter and swings the yoke $R^3$ to move the shaft $R^4$ in the inward direction (to the right in Fig. 58) and presses the arm $R^6$, with the roller $e^{19}$, into the path of the cam-plate M'. Thus in the next downward plunge of the cam-plate M' its cam edge $h'$, Fig. 50, strikes the roller $e^{19}$ and turns the arms $R^5 R^6$ in the direction which forces the link $R^7$ in the direction to the left in Fig. 41, whereby the crank S' is rocked to actuate the strengthening-wire-cutter mechanism, and whereby the crank $S^5$ on the opposite end of the rock-shaft S engages the pin $q^9$ and raises the rod $q^4$ to disengage the clutch members on the drive-shaft and stop the machine. The movement to the left in Fig. 41 of the link $R^7$ also turns the lever $R^8$ on its pivot at $P^{10}$, whereby the antifriction-roller $e^{22}$, carried by the lever, (see Fig. 52,) extends in the path of the cam-surface $h$ of the cam-plate M'. Thus in the next upward stroke of the cam-plate M', which is the last movement before the machine stops, the cam-surface $h$ of the cam-plate engages the antifriction-roller $e^{22}$ and returns the lever $R^8$ and through it the link $R^7$ and the arms $R^6 R^5$ to their initial positions.

At the same time that the link $R^7$ is moved to the left in Fig. 41 the pin $e^{20}$ thereon engages the downwardly-extending cam-finger $f^7$ and swings it from between the cam $f^4$ and the stationary stop $f^{10}$, (in which position it has held the clutch members $g^5 g^9$ in engagement, as before described,) thereby permitting the spring $g^{24}$ to separate the clutch members $g^5 g^9$, as shown in Fig. 46, and permit the spring $g^{11}$ to swing the arm $Q^8$ to its initial position against the stop $g^{12}$, as shown in Fig. 40. After the finger $h^{10}$ has acted upon the crank-arm $e^6$ in the manner described to actuate the strengthening-wire-severing mechanism the pin $h^9$ on the cam-plate M' in the next downward plunge of the carrier strikes the crank-arm $e^6$ and turns it in the downward direction, whereby the shaft R' is rocked to turn the cam $e^5$, so that the bar R will be raised to its initial position by the swinging of the rock-shaft $R^2$, effected by the recoil of the spring $e^{14}$. Directly after the pin $h^9$ has turned the crank-arm $e^6$ the end of the shaft R' is engaged by the cam $h^{13}$ (on the plate M') and pushed in the direction (to the left in Fig. 56) which carries the crank-arm $e^6$ both out of the path of the toe $h^{12}$ on the finger $h^{10}$ and to the position shown in Fig. 56. When the swinging cam-finger $f^7$ is moved by the pin $e^{20}$ from between the stop $f^{10}$ and cam $f^4$, as described, the weight of the long arm of the lever $f^6$ will swing its short arm upward against the stop $f^9$ and thus raise the finger $f^7$ to its initial position, ready to be engaged by the finger M² on the carrier M in its next downward plunge, as before described.

In Figs. 25 and 26 I show the clenchers I prefer to employ and which are of special and improved construction to render them readily adjustable and strong. Each clencher comprises a block or shell V', fastened to the respectively adjacent cleat-guide bar B⁵, B⁶, or B⁷. Extending vertically through the shell or block V' is a guide-opening V² for the clencher-stem V³. The clencher-stem is surmounted by a clencher head or anvil V⁴. The lower part of the guide-opening V³ is enlarged, as indicated in Fig. 26, and crossing the same is a chamber just large enough to receive an adjusting-wheel V⁵. Below the adjusting-wheel V⁵ and extending through the latter is a base or socket-piece V⁶, having a keyway at which the wheel V⁵ is feathered thereon, as indicated at V⁷, to cause the wheel and socket-piece V⁶ to turn together. The socket-piece V⁶ is capable of moving longitudinally through the wheel V⁵, and its socket portion is threaded to receive the lower threaded end portion of the stem V³. On the stem V³ is a pin V⁸, which passes through an elongated slot V⁹ in the side of the shell V', and is there provided with a pointer V¹⁰, which moves along a scale V¹¹ on the shell at the side of the said slot. On the drive-shaft D are eccentrics V¹², which are connected by means of suitable plunger-rods V¹³ with a horizontal cross-head V¹⁴, extending parallel with the cross-head N, which actuates the staple forming and driving devices. The bases or socket-pieces V⁶ at their lower ends rest firmly upon the upper edge of the cross-head V¹⁴, and confined between the wheels V⁵ and annular shoulders on the socket-pieces V⁶ are springs V¹⁵. In the circumferential face of each wheel V⁵ is a series of holes V¹⁶, into which a lever may be inserted to turn the wheel, and confined in the shell V', in the manner shown in Fig. 26, is a spring pin or catch V¹⁷, adapted to enter and engage the holes V¹⁶. The wheels V⁵ fit snugly in the recesses in which they are housed, and in the upward movement of the cross-head V¹⁴ the socket-pieces are raised against the resistance of the springs V¹⁵ to raise the stems V³ and heads V⁴. In each downward movement of the cross-head the socket-pieces V⁶, with the stems V³ and heads V⁴, are moved downward with the cross-head by the springs V¹⁵. The stems V³ may be raised and lowered in the socket-pieces V⁶ as desired for the purpose of adjustment by withdrawing the spring-pins V¹⁷ and turning the wheels V⁵. The scale V¹¹ will aid in making the desired adjustment. In the operation of the staple-drivers the impacts upon the clenchers are conveyed through the stems and socket-pieces to the cross-head V¹⁴, and there is no strain upon the shells V' or the cleat-guides on which they are mounted.

Many of the details are constructed as described for the purpose of rendering them adjustable, whereby box-blanks X, Fig. 70, of different dimensions may be manufactured by the same machine. The thin wooden sheets or strips X', which are to form the outer sides of the ultimate box, are provided of the proper width and length, a sheet for a box being preferably all in one piece and about one-eighth of an inch in thickness. The cleats are of the same length as the sheet and may be, say, one-half an inch thick and three-fourths of an inch wide. In practice the sheets and cleats may be provided of a length a trifle greater than is required for the box to allow for shrinkage in drying before being operated upon by the present machine. As shown in Fig. 72, the outer cleats X² are upon edge, while the intermediate cleats X³ extend flatwise along the sheet. Presuming, for example, that the ultimate box is to be one and one-half feet square by three feet long and employ cleats one-half an inch thick by three-fourths of an inch wide, the sheets provided would be just three feet wide and not less than six feet long and the cleats of approximately the same length.

The adjustment of the machine for a box of the dimensions named would be effected as follows: On the plate $n^{11}$ of each guide B⁵, B⁶, and B⁷ (see, for example, Fig. 15) is a scale $y$, with which the upper end of the adjacent finger $n^{12}$ registers to indicate the height of the upper or guide surface $n^4$ of the bar $n^3$ with reference to the resilient guide $n^{36}$ (see Figs. 18 and 19) for the edge of the sheet. A handle $n^{22}$, Fig. 17, is applied to the screws $n^{19}$, and the adjustment of the bar $n^3$ is effected as before described. The bar $n^3$ of the outer cleat-guides B⁵ B⁶ will be raised or lowered, as required, to cause their guide-surfaces $n^4$ to extend in a plane three-fourths of an inch below the sheet-guides $n^{36}$ to accommodate the cleats X², and the bars $n^3$ of the intermediate guides B⁷ will be adjusted in the same manner to extend at their surfaces $n^4$ one-half an inch below the upper edges of the bars $n$ to accommodate the cleats X³. Thus the distance between the upper feed-roller $r^6$ and lower feed-wheel $n^{27}$ will be just sufficient to cause them to firmly grip the sheet and cleats between them, as indicated, for example, in Fig. 36. The second and third feed-rollers $r^6$ occupy fixed positions, and the rollers I I are normally in the same plane as the said rollers $r^6$. The feed-rollers C² are then adjusted by means of the hand-wheels $s^3$ and mechanism actuated thereby, (see Figs. 10 to 13,) all as before described, to extend one-eighth of an inch below the rollers I II to grip the sheet. By means of the hand-wheel B¹³ (see Fig. 1, for example) the screw-shafts B⁸ B⁹ (see Fig. 8) are turned coincidently, as before described, to cause the outer cleat-guides B⁵ B⁶ to approach or recede from each other until the guides $n^{36}$ for the edges of the sheet are just three feet apart.

As shown most clearly in Fig. 15, the cleat-guides rest upon the cross-bars $B^3$, $B^{25}$, and $B^4$ of the bed-frame, the bars $B^3$ and $B^{25}$ being T-shaped in cross-section. On each of the guide-bars $B^5$ $B^6$ $B^7$ at the bar $B^{25}$ is a thumb-screw $n^{40}$, arranged to clamp the bar $B^{25}$. Also on each guide-bar $B^5$ $B^6$ $B^7$ is a clamp consisting of a sliding block $n^{41}$, actuated by a thumb-screw $n^{42}$ to clamp the bar $B^3$. When the guide-bars $B^5$ $B^6$ are adjusted as described, they may be tightened in adjusted position by means of the thumb-screws $n^{40}$ and $n^{42}$. The intermediate guide-bars $B^7$ are adjusted by sliding them by hand to the desired positions to operate as guides for the cleats $X^3$, and they are tightened in adjusted position by means of their thumb-screws $n^{40}$ $n^{42}$. As before described, the lower rear guide-wheels $C^2$ are adjusted upon the shafts $C$ $C'$ in the movement of the guide-bars $B^5$ $B^6$.

The staple forming and driving devices T are fastened at their body portions upon the beam $A^4$ by means of thumb-screws $T'$, as indicated in Fig. 4. On the beam $A^4$, as indicated at $y'$ in Figs. 6 and 7, is a scale marked with inches, and the staple forming and driving devices are positioned by means of this scale to extend over the paths of the cleats $X^2$ $X^3$. The operating-bars $T^2$ of the staple forming and driving machines are connected by means of suitable clamps or clamp-blocks $T^3$ to the cross-head N, as indicated in Fig. 4, and when adjusted they are clamped in place by means of screws $T^4$. The clenchers V are also adjusted by turning the wheels $V^5$ thereon to cause the clencher heads or anvils $V^4$ in the rise of the cross-head $V^{14}$ to just reach the plane of the under surfaces of the cleats. The scale on the disk $Q^{10}$ (see Fig. 39) will indicate the distance of travel of the arm or tripping device $Q^8$ with reference to the movement of material through the machine. The posts $Q^{11}$, $Q^{12}$, $Q^{13}$, and $Q^{14}$ are adjusted in the T-groove $Q^7$ to cause the arm or tripping device to reach the post $Q^{11}$ when the first skip is to be made, the post $Q^{12}$ when the second skip is to be made, the post $Q^{13}$ when the third skip is to be made, and the post $Q^{14}$ when the strengthening-wires are to be severed and the machine stopped.

The distances that parts will be moved with each rotation of the drive-shaft to feed the material are regulated at the disk E by adjusting the various bolts in the openings $p^5$ $p^6$ $p^7$, and the increased distance that the material is moved under the action of the skipper mechanism is regulated by the adjustment of the plunger-rod $f^{37}$ in the slot of the bell-crank lever $f^{38}$. These adjustments need not ordinarily be changed.

The parts being adjusted as described, the operation will be as follows: Before starting the machine the operating-handle $M^8$ is turned, as before described, to raise the forward feed-roller $r^6$ and lower the stops $m^{24}$, as shown in Fig. 37, and cleats $X^2$ $X^3$ are placed in the guides $B^5$ $B^6$ $B^7$ against the stops $m^{24}$. A sheet $X'$ is then placed upon the cleats against the stops $m^{24}$, and the handle $m^8$ is turned to depress the said roller $r^6$ and raise the stops $m^{24}$ to the positions shown in Figs. 36 and 38. The primary feed-rollers $r^6$ $n^{27}$ and secondary feed-rollers $C^2$ are roughened or serrated, as shown, to cause them to grip the material firmly, and it will be understood that they all rotate at the same rate of speed except when the primary rollers are accelerated by being driven from the pulley L, as described, or the secondary rollers are accelerated by the skipper mechanism. In the latter instance the primary rollers would also be accelerated under the dragging force of the material, if engaging the latter. The lever $L^3$ may then be turned to cause the shaft F to be rotated from the pulley L and rotate the primary feed-rollers to feed the material forward as far as the staple forming and driving devices. In practice the material will be fed nearly as far as the staple-drivers in the manner described, and then the lever $L^3$ will be turned to disengage the shaft F from the pulley L, after which the material will be worked forward by means of the handle or lever $K'$ until it is in proper position. After this has been done the handle $q^7$ is turned to start the machine, as before described. In passing along the guide-bars the sheet is held flat against the cleats by the overlapping guide-flanges $n^5$ of the outer bars $B^5$ $B^6$, and the cleats are pressed against the sides of their guides by the spring-fingers $n^{33}$. The fingers $n^{33}$ nearest the stapling devices are rigid, as before described, and are adjusted to hold the cleats against any lateral play as they pass beneath the staplers. The staples are formed from wires $d$, wound upon reels $d'$, and the strengthening-wires $c$ are wound upon reels $c'$. At the reels are suitable tensioning devices $c^2$ $d^2$. The operation of the staple forming and driving devices and the construction of the reels and tensioning devices are fully set forth in the patent before referred to and require no description in the present connection. The parts of the machine are so constructed with reference to each other that in each upstroke of the cross-head N staples are formed from the wires $d$ and cut off ready to be driven. At the same time the cross-head $V^{14}$ is plunged downward to lower the clenchers, and the disk E is rocked to turn the feed-rollers $r^6$, feed-wheels $n^{27}$, and feed-wheels $C^2$. By this means the material is advanced beneath the staple forming and driving machines. In the downward plunge of the stapling devices and simultaneous upward plunge of the clenchers the disk E is rocked in the opposite direction to that described, so that the material will remain stationary. Thus the feed will always alternate in its action with the staple drivers and clenchers. The staples $d^3$, as before stated, are driven to straddle the strengthening wires and fasten them and the sheet to the cleats. The strengthening-wires are fed by being drawn by the material after the first staples are driven. With the first advance of the material the arm $Q^8$ starts from the stop $g^{12}$, moving intermittingly, the same as the feed-wheels. While the machine is thus running the material will be advanced, say, two and one-fourth inches during each upstroke of the staple-drivers, whereby the staples will extend about two and one-fourth inches apart until the arm $Q^8$ reaches the first post $Q^{11}$ to actuate the skipper mechanism. The increased speed momentarily given to the feed-wheels $C^2$ will advance the material, say, four inches in the simultaneous upstroke of the stapling devices, so that the next staples driven will be four inches from those previously driven, after which the material will be fed at normal speed, whereby the staples are driven two and one-fourth inches apart until the arm $Q^8$ reaches the stop $Q^{12}$, when the material will advance another four inches. This operation is repeated when the arm $Q^8$ passes the stop $Q^{13}$. The accelerated movement of the wheels $C^2$ draws the material and through the latter accelerates the rollers $r^6$ and wheels $n^{27}$, so that they will not drag upon the material. When the arm $Q^8$ passes the stop $Q^{14}$, it is released, as before described, and returned by its spring $g^{11}$ to its initial position against the stop $g^{12}$. At the same time the rock-shaft S is turned, as before described, to turn the switch-fingers of the stapling devices, whereby in the next and last upstroke of the stapling devices the strengthening-wires $c$ will be severed and afterward automatically advanced, as more fully described in the aforesaid Letters Patent No. 483,254, to cause the ends of the strengthening-wires to extend past the end of the blank, as indicated in Fig. 70.

It is desirable that the machine shall be automatically stopped, as described, when a blank has passed from beneath the stapling devices and the strengthening-wires are cut in order that the operator may make certain that the next material to be operated upon is properly positioned at the staple-drivers to receive the first staples in the proper locations. The first staples must be properly located on the blank, because the feed mechanism in its movement following the first downward stroke of the staplers determines the locations of the skips made by the skipping mechanism, and the skips should be such that staples will be driven at equal distances from opposite sides of the box-corner lines $x$ of the blank. As the operator may commence placing cleats and a sheet in position as soon as the material previously fed has passed the first feed-roller $r^6$, the stopping of the machine need be but momentary in each instance.

When it is desired to withdraw a finished blank from the machine before starting up the latter to turn the rear feed-wheels $C^2$, the roller I may be raised to release the blank by lifting the lever $I^4$, as before described.

The machine constructed as described is capable of turning out blanks of the dimensions above given at the rate of about two hundred per hour. I wish it to be understood, however, that the mechanisms shown and described may be modified, more especially in the matter of details of construction, without departing from the spirit of my invention as defined by the claims.

What I claim as new, and desire to secure by Letters Patent, is—

1. In a machine for forming box-blanks by tacking a sheet and strengthening-wires to reinforcing-cleats, the combination of guides for the cleats, intermittent feed mechanism for advancing the cleats longitudinally in their guides and with a sheet through the machine, an intermittingly-acting tacking device adjacent to the path of each cleat, alternating in its action with said feed mechanism, to fasten the sheet, by successive operations, to the cleat, means for guiding strengthening-wires with the cleats and sheet across the tacking devices, and relative skipping means actuated by the said feed mechanism, and operating, at predetermined intervals, in the passage of the sheets and cleats through the machine, to accelerate the feed during a single intermittent movement and thereby produce an increase of the distance between points of tacking, substantially as described.

2. In a machine for forming box-blanks by tacking a sheet and strengthening-wires to reinforcing-cleats, the combination of guides for the cleats, intermittent feed mechanism for advancing the cleats longitudinally in their guides, and with a sheet through the machine, comprising primary and secondary feed-rollers rotating normally at the same rate of speed, an intermittingly-acting tacking device adjacent to the path of each cleat, alternating in its action with said feed mechanism, to fasten the sheet, by successive operations, to the cleat, means for guiding strengthening-wires with the cleats and sheet across the tacking devices, and relative skipping means actuated by the said secondary feed-rollers, at predetermined intervals, in the passage of the sheets and cleats through the machine, to accelerate the feed and thereby produce an increase of the distance between points of tacking, substantially as described.

3. In a machine for forming box-blanks by fastening a sheet and strengthening-wires to reinforcing-cleats, the combination of a drive-shaft, guides for the cleats, intermittent feed mechanism, comprising feed-rollers, a ratchet-wheel geared to the feed-rollers, and a primary ratchet-wheel-engaging pawl actuated from the drive-shaft to turn the said ratchet-wheel and feed-rollers intermittingly to advance the cleats longitudinally in their guides and with the sheet through the machine, an intermittingly-actuated tacking device adjacent to the path of each cleat, alternating in its action with said feed mechanism to fasten the sheet, by successive operations, to the cleat, means for guiding strengthening-wires with the cleats and sheet across the tacking devices, and relative skipping means, comprising a secondary ratchet-wheel-engaging pawl actuated from the said drive-shaft and normally out of engagement with the said ratchet-wheel, and pawl-engaging means actuated, at predetermined intervals, in the passage of the sheet and cleats through the machine, to move the said secondary pawl into engagement with the ratchet-wheel and thereby accelerate the feed to produce an increase of the distance between points of tacking, substantially as described.

4. In a machine for forming blanks by fastening a sheet to cleats, the combination with intermittingly-actuated tacking devices and with feed mechanism alternating in its action with the tacking devices to feed the sheet and cleats intermittingly across the said devices, of skipper mechanism at the said feed mechanism, operating, at intervals in the passage of the sheet and cleats through the machine, to accelerate the feed and thereby produce an increase of the distance between points of tacking, the said skipper mechanism being adjustable to regulate the said intervals, substantially as described.

5. In a machine for forming blanks by fastening a sheet to cleats, the combination of a drive-shaft, guides for the cleats, feed mechanism, comprising feed-rollers, a ratchet-wheel geared to said feed-rollers, and primary pawl at the said ratchet-wheel actuated from the drive-shaft for moving the feed-rollers intermittingly to advance the cleats longitudinally in their guides and with the sheet through the machine, an intermittingly-actuated tacking device adjacent to the path of each cleat, alternating in its action with said feed mechanism, to fasten the sheet, by successive operations, to the cleat, and skipper mechanism comprising a secondary pawl actuated from the said drive-shaft and adjacent to but normally out of engagement with said ratchet-wheel, a tripping device movable under the influence of the feed-rollers, a stop in the path of said tripping device, and a connection between said tripping device and secondary pawl, whereby in the engagement of the tripping device with the said stop the said secondary pawl is moved to engage the said ratchet-wheel and thereby increase the movement of the feed-rollers and thus produce an increase of the distance between points of tacking, substantially as described.

6. In a machine for forming blanks by fastening a sheet to cleats, the combination of a drive-shaft, guides for the cleats, feed mechanism comprising feed-rollers, a ratchet-wheel geared to said feed-rollers, and a primary pawl at the said ratchet-wheel actuated from the drive-shaft for moving the feed-rollers intermittingly to advance the cleats longitudinally in their guides and with the sheet through the machine, an intermittingly-actuated tacking device adjacent to the path of each cleat, alternating in its action with said feed mechanism, to fasten the sheet, by successive operations, to the cleat, and skipper mechanism comprising a secondary pawl actuated from the said drive-shaft and adjacent to but normally out of engagement with said ratchet-wheel, a tripping device movable under the influence of the feed-rollers, a scale along which said tripping device moves, a stop adjustable along the said scale and in the path of said tripping device, and a connection between the said tripping device and secondary pawl, whereby in the engagement of the tripping device with the said stop the said secondary pawl is moved to engage the said ratchet-wheel and thereby increase the movement of the feed-rollers and produce an increase of the distance between points of tacking, substantially as described.

7. In a machine for forming box-blanks by fastening a sheet and strengthening-wires to cleats, the combination of a drive-pulley provided with a clutch member, a drive-shaft provided with a clutch member, shipping mechanism for said clutch members operating to throw them into and out of engagement to throw the drive-shaft into and out of engagement with its driving-pulley, guides for the cleats, intermittent feed mechanism, actuated from the said drive-shaft for advancing the cleats longitudinally in their guides and with the sheet through the machine, a tacking device adjacent to the path of each cleat and operated intermittingly from the said drive-shaft to alternate in its action with said feed mechanism and fasten the sheet, by successive operations, to the cleats, relative skipping means actuated by the said feed mechanism, at predetermined intervals, to accelerate the feed and thereby produce an increase of the distance between points of tacking in a single intermittent movement of the feed, and means actuated by the said feed mechanism for moving the said clutch-shipping mechanism to stop the machine, substantially as and for the purpose set forth.

8. In a machine for forming box-blanks by fastening sheets and strengthening-wires to reinforcing-cleats, the combination of guides for the cleats, intermittent feed mechanism for advancing the cleats longitudinally in their guides and with a sheet through the machine, an intermittingly-actuated staple-driver adjacent to the path of each cleat, alternating in its action with said feed mechanism, to fasten the sheet and strengthening-wires, by successive operations, to the cleats, means for guiding the strengthening-wires with the sheet across the staple-drivers, and relative skipping means operating, at predetermined intervals, in the passage of the sheet and cleats through the machine, to accelerate the feed and thereby produce an increase of the distance between the points at which the staples are driven in a single intermittent movement of the feed, substantially as described.

9. In a machine for forming box-blanks by fastening sheets and strengthening-wires to reinforcing-cleats, the combination of guides for the cleats, intermittent feed mechanism for advancing the cleats longitudinally in their guides and with a sheet through the machine, an intermittingly-actuated staple-driver adjacent to the path of each cleat, alternating in its action with said feed mechanism, to fasten the sheet and strengthening-wires, by successive operations, to the cleats, means for guiding the strengthening-wires with the sheet across the staple-drivers, relative skipping means actuated by the said feed mechanism at predetermined intervals, in the passage of the sheet and cleats through the machine, to accelerate the feed and thereby produce an increase of the distance between the points at which the staples are driven in a single intermittent of the feed, and strengthening-wire-severing mechanism actuated from the said feed mechanism, to sever the strengthening-wires when the sheet and cleats have passed the staple-drivers, substantially as described.

10. In a machine for forming box-blanks by fastening sheets and strengthening-wires to reinforcing-cleats, the combination of a drive-shaft and driver therefor, clutch mechanism between the said driver and shaft, clutch-shipping mechanism, guides for the cleats, intermittent feed mechanism actuated from the said drive-shaft for advancing the cleats longitudinally in their guides and with a sheet through the machine, an intermittingly-actuated staple-driver adjacent to the path of each cleat, operated from the said drive-shaft and alternating in its action with said feed mechanism to fasten the sheet and strengthening-wires, by successive operations, to the cleats at intervals in the direction longitudinally of the cleat, means for guiding strengthening-wires with the sheet across the staple-drivers, relative skipping means actuated by the said feed mechanism at predetermined intervals in the passage of the sheet and cleats through the machine, to accelerate the feed and thereby produce an increase of the distance between points at which staples are driven in a single intermittent movement of the feed, and means, actuated from the said feed mechanism, for moving the said clutch-shipping mechanism to stop the machine when the cleats and sheet have passed the staple-drivers, substantially as described.

11. In a machine for forming blanks by fastening a sheet to cleats, the combination of guides for the cleats, intermittent feed mechanism, for advancing the cleats longitudinally in their guides and with the sheet through the machine, comprising primary and secondary feed-rollers rotating normally at the same rate of speed, an intermittingly-actuated tacking device adjacent to the path of each cleat, alternating in its action with said feed mechanism to fasten the sheet, by successive operations, to the cleats, and means for increasing the movement of the primary feed-rollers to hasten the movement of the sheet and cleats toward the tacking devices, substantially as described.

12. In a machine for forming blanks by fastening a sheet to cleats, the combination of laterally-adjustable guides for the cleats, intermittent feed mechanism, for advancing the cleats longitudinally in their guides and with the sheet through the machine, the said feed mechanism being formed with feed-rollers extending crosswise of the machine in the plane above the said guides and feed-wheels journaled in the said guides, an intermittingly-actuated tacking device supported adjacent to the path of each cleat and laterally adjustable on its support and alternating in its action with the said feed mechanism to fasten the sheet, by successive operations, to the cleats, substantially as described.

13. In a machine for forming blanks by fastening a sheet to cleats, the combination of a main drive-shaft, guides for the cleats, intermittent feed mechanism, for advancing the cleats longitudinally in their guides, and with the sheet through the machine, comprising primary and secondary feed-rollers rotating normally at the same rate of speed, an intermittingly-actuated tacking device adjacent to the path of each cleat, alternating in its action with said feed mechanism, to fasten the sheet, by successive operations, to the cleats, a secondary drive-shaft actuated from the main drive-shaft and to which the primary feed-rollers are geared, and means for increasing the movement of the primary feed-rollers, to hasten the movement of the sheet and cleats toward the tacking devices, comprising speed-gear mechanism actuated from the main drive-shaft and with which the said secondary drive-shaft may be thrown into and out of engagement at will, substantially as described.

14. In a machine for forming blanks by fastening a sheet to cleats, the combination of a main drive-shaft, guides for the cleats, intermittent feed mechanism, for advancing the cleats longitudinally in their guides, and with the sheet through the machine, comprising primary and secondary feed-rollers rotating normally at the same rate of speed, an intermittingly-actuated tacking device adjacent to the path of each cleat, alternating in its action with said feed mechanism, to fasten the sheet, by successive operations, to the cleats, a secondary drive-shaft actuated from the main drive-shaft and to which the primary feed-rollers are geared, and means for rotating the said secondary drive-shaft independently of the main drive-shaft, comprising pawl-and-ratchet mechanism at the secondary drive-shaft, and an operating-handle therefor, substantially as and for the purpose set forth.

15. In a machine for forming blanks by fastening a sheet to cleats, the combination with the guides for the cleats and intermittent tacking devices at said guides, of intermittent feed mechanism for advancing the cleats longitudinally in their guides and with the sheet through the machine, comprising a series of upper and lower feed-rollers, between the forward end of the guides and tacking devices and lever mechanism operative at will to raise the first upper feed-roller and the upper feed-roller adjacent to said tacking devices, substantially as and for the purpose set forth.

16. In a machine for forming blanks by fastening a sheet to cleats, the combination with intermittingly-actuated tacking devices, of outer and intermediate guides for the cleats, yielding guides for the edges of the sheet on the said outer cleat-guides, and intermittingly-actuated feed mechanism for advancing the sheet and cleats in their guides longitudinally across the said tacking devices, the said feed mechanism alternating in its action with the said tacking devices, substantially as described.

17. In a machine for forming blanks by fastening a sheet to cleats, the combination with intermittingly-actuated tacking devices, of guides for the cleats, yielding guides for the edges of the sheet, overlapping guides for the edge portions of the sheet and feed mechanism for advancing the sheet and cleats in their guides longitudinally across the said tacking devices, the said feed mechanism alternating in its action with the said tacking devices, substantially as described.

JACOB UHRI.

In presence of—
  M. J. FROST,
  J. N. HANSON.